(12) United States Patent
Arahira

(10) Patent No.: US 8,078,062 B2
(45) Date of Patent: Dec. 13, 2011

(54) CARRIER-SUPPRESSED OPTICAL PULSE TRAIN GENERATING DEVICE AND METHOD

(75) Inventor: Shin Arahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 569 days.

(21) Appl. No.: 12/289,872

(22) Filed: Nov. 6, 2008

(65) Prior Publication Data

US 2009/0180786 A1 Jul. 16, 2009

(30) Foreign Application Priority Data

Jan. 11, 2008 (JP) ................................. 2008-004435

(51) Int. Cl.
*H04B 10/12* (2006.01)
(52) U.S. Cl. .......... 398/189; 398/183; 398/198; 372/25; 372/30
(58) Field of Classification Search .................. 398/183, 398/189, 198; 372/25
See application file for complete search history.

(56) References Cited

U.S. PATENT DOCUMENTS

| 2001/0017724 A1* | 8/2001 | Miyamoto et al. ............. 359/158 |
| 2002/0030878 A1* | 3/2002 | Ohhiro ............................ 359/183 |
| 2009/0092400 A1* | 4/2009 | Igarashi et al. ................. 398/141 |
| 2009/0136241 A1* | 5/2009 | Mo et al. ......................... 398/188 |

OTHER PUBLICATIONS

A. Hirano, Y. Miyamoto, S. Kuwahara, M. Tomizawa, and K. Murata, "A Novel Mode-Splitting Detection Scheme in 43-Gb/s CS- and DCS-RZ Signal Transmission", IEEE J. Lightwave Technology, vol. 20, No. 12, pp. 2029-2034, 2002.
K. Sato, A. Hirano, and N. Shimizu, "Dual mode operation of semiconductor mode-locked lasers for anti-phase pulse generation", Technical Digest of OFC 2000, paper ThW3-1 • 3-3, 2000.
L.A. Johansson, Zhaoyang Hu, D.J. Blumenthal, L.A. Coldren, Y.A. Akulova, and G.A. Fish, "40-GHz Dual-Mode-Locked Widely Tunable Sampled-Grating DBR Laser", IEEE Photon. Technol. Lett., vol. 17, No. 2, pp. 285-287, 2005.
C. Bobbert, J. Kreissl, L. Molle, F. Raub, M. Rohde, B. Sartorius, A. Umbach, and G. Jacumeit, "Novel Compact 40 GHz PZ-Pulse-Source based on Self-Pulsating PhaseCOMB Lasers", Technical Digest of OFC 2004, paper WL5, 2004.
H. Murai, M. Kagawa, H. Tsuji, and K. Fujii, "EA Modulator-Based Optical Multiplexing/Demultiplexing Techniques for 160 Gbit/s OTDM Signal Transmission", IEICE Trans. Electron., vol. E88-C, No. 3, pp. 309-318, 2005.

(Continued)

*Primary Examiner* — Dung Nguyen
(74) *Attorney, Agent, or Firm* — SOLARIS Intellectual Property Group. PLLC

(57) ABSTRACT

The device is structured to have a first electric modulation signal generator, a second electric modulation signal generator, a two-mode beat light source and an optical intensity modulator. The first electric modulation signal generator generates and outputs a first electric modulation signal. The second electric modulation signal generator generates and outputs a second electric modulation signal of a same frequency as the first electric modulation signal and to which a phase difference of $\delta$ radians is provided ($\delta$ is a real number satisfying $0 \leq \delta \leq \pi$). The two-mode beat light source is driven by the first electric modulation signal, and generates and outputs two-mode beat light. The two-mode beat light is inputted to the optical intensity modulator, and the optical intensity modulator generates and outputs a CS optical pulse train. Light transmittance of the optical intensity modulator is modulated by the second electric modulation signal.

10 Claims, 12 Drawing Sheets

OTHER PUBLICATIONS

S. Arahira, H. Yaegashi, K. Nakamura, and Y. Ogawa, "Generation of carrier-suppressed broad pulses from model locked DBR laser operating with two carrier wavelengths", Electronics Letters, Oct. 12, 2006, vol. 42, No. 21, pp. 1298-1300.

V. Jayaraman, Z-M. Chuang, and L.A. Coldren; "Theory, Design, and Performance of Extended Tuning Range Semiconductor Lasers with Sampled Gratings", IEEE Journal of Quantum Electronics, vol. 29, No. 6, pp. 1824-1834, 1993.

* cited by examiner

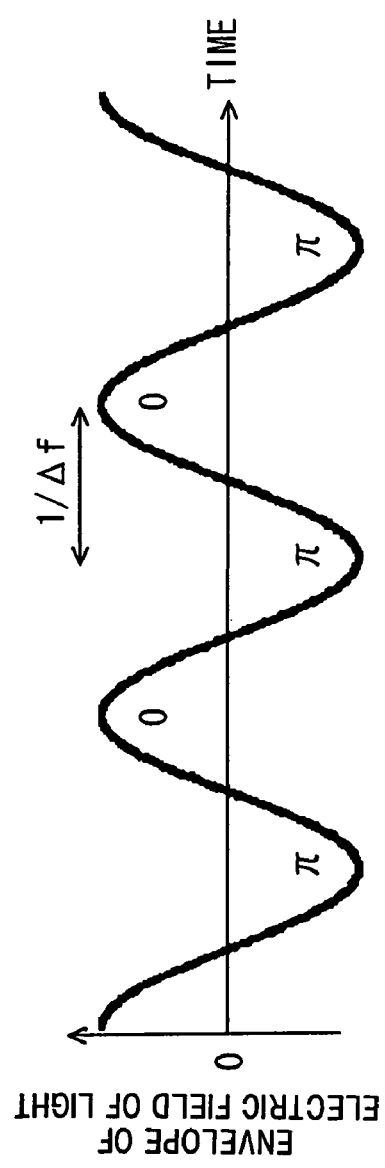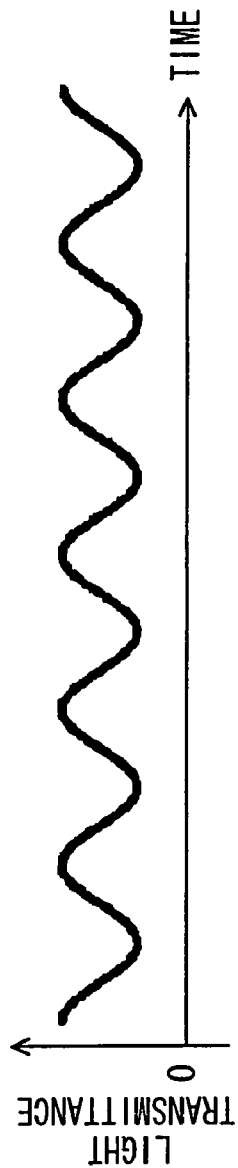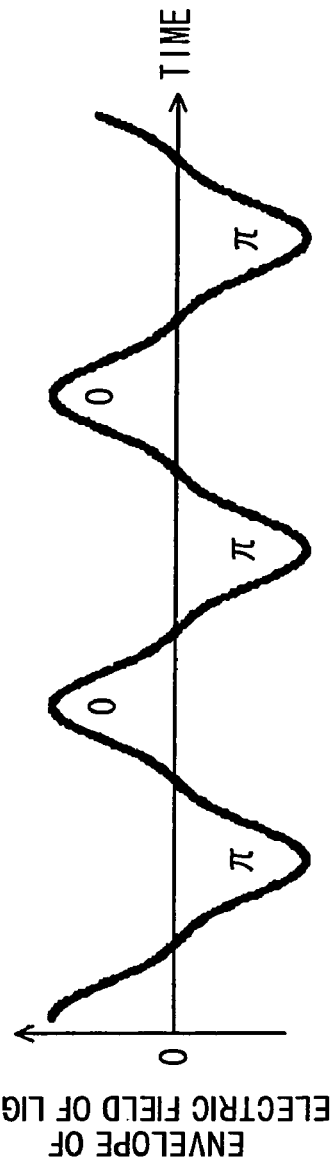

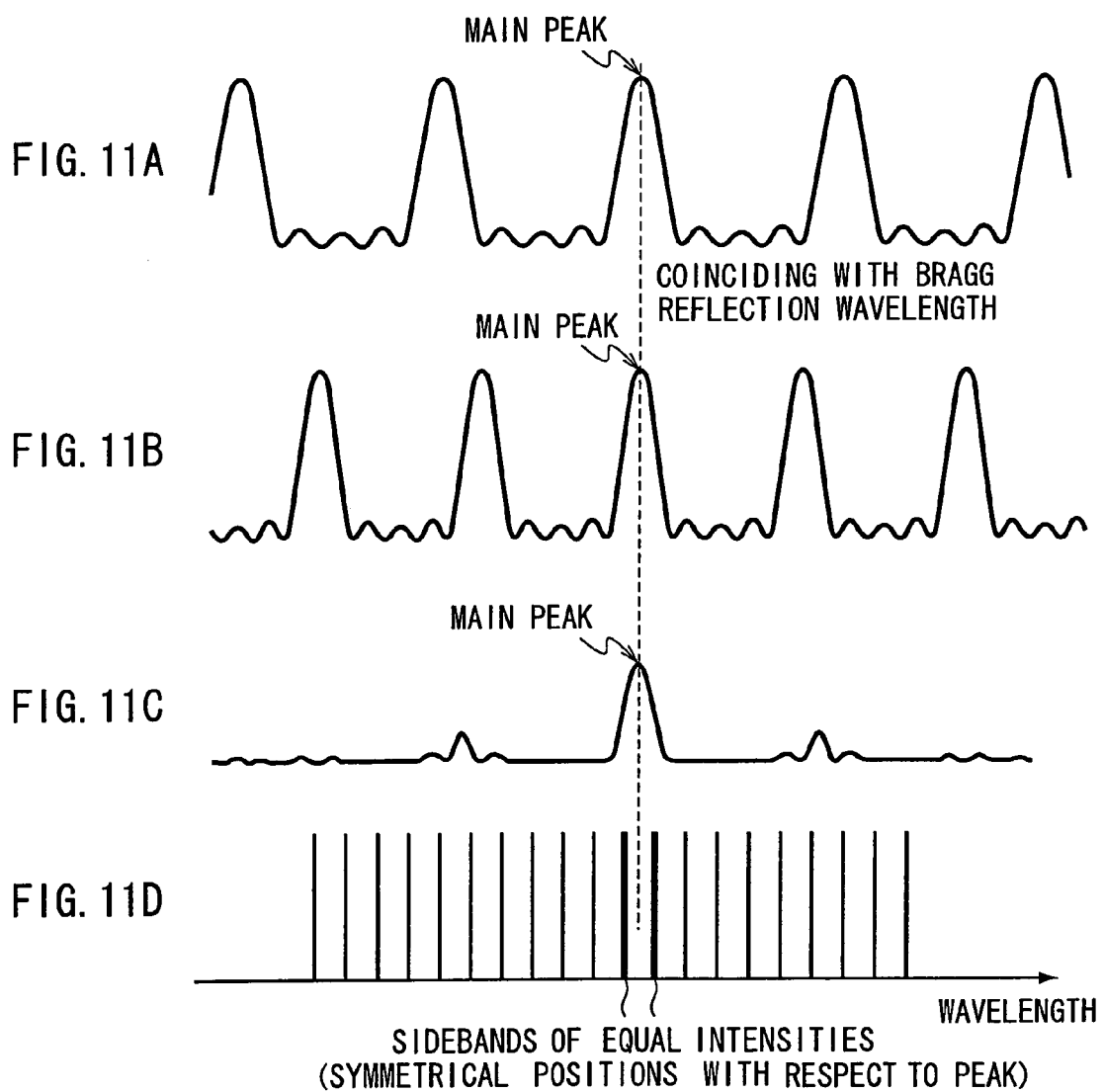

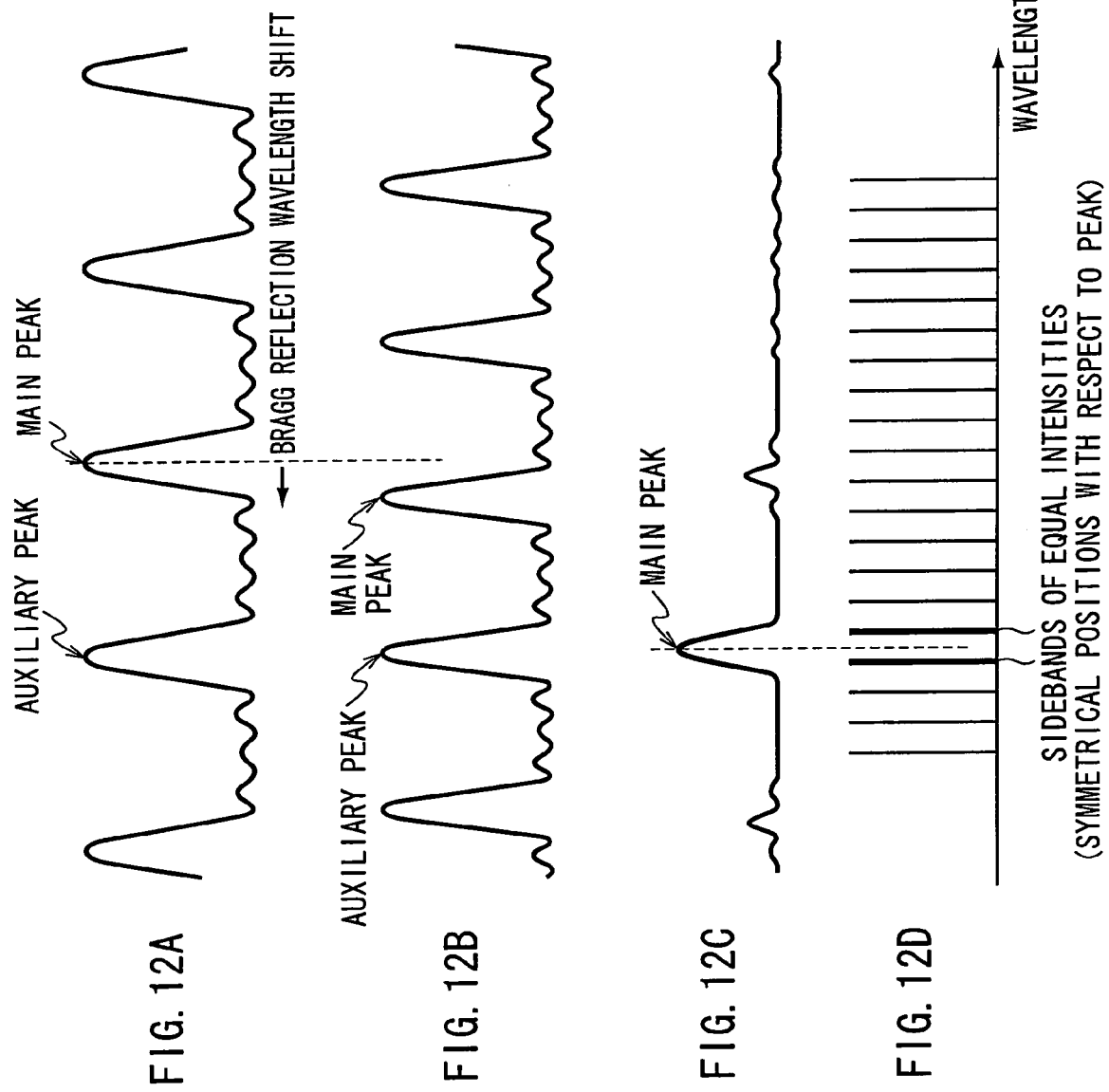

CARRIER-SUPPRESSED OPTICAL PULSE TRAIN GENERATING DEVICE AND METHOD

CROSS-REFERENCE TO RELATED APPLICATION

This application claims priority under 35 USC 119 from Japanese Patent Application No. 2008-004435, the disclosure of which is incorporated by reference herein.

BACKGROUND OF THE INVENTION

1. Field of the Invention

The present invention relates to a CS (Carrier-Suppressed) optical pulse train generating device for generating an optical pulse signal in accordance with carrier-suppressed RZ (Return to Zero) format optical intensity modulation or optical phase modulation, and to a CS optical pulse train generating method using this device.

2. Description of the Related Art

The capacities and long-distance capabilities of transmission of optical communications networks are increasing. There have been proposed various types of formats of the optical signals used in optical communications systems that structure optical communications networks. Among these, several are being put into practical use. A representative optical signal format that is being put into practical use is the optical intensity modulation format that expresses a binary digital signal by the strength of the optical intensity. There are two main types of optical intensity modulation formats, which are an NRZ (Non Return to Zero) format in which the optical intensity is maintained during a continuous "1" signal, and an RZ format in which the optical intensity becomes zero once during a continuous "1" signal.

An RZ format optical signal is generated by an optical intensity modulator optical-intensity-modulating the individual optical pulses that structure an optical pulse train in the optical pulse train that is lined-up orderly at uniform intervals on the time axis. The optical intensity modulation of the individual optical pulses structuring the optical pulse train is the generating of a binary digital signal by selectively cutting-off or transmitting-through the optical pulses that structure the optical pulse train. In order to generate an RZ format optical signal, the optical pulse train is needed in advance, and a light source that generates the optical pulse train is needed.

As described above, an RZ format optical signal is a binary digital signal obtained by optical-intensity-modulating an optical pulse train that is lined-up orderly at uniform intervals on the time axis. Accordingly, "optical pulse signal" and "optical pulse train" have the following meanings hereinafter. "Optical pulse signal" is used to indicate a row of optical pulses serving as a binary digital signal that is obtained by optical-intensity-modulating an optical pulse train that is lined-up orderly at uniform intervals on the time axis. On the other hand, "optical pulse train" is used to indicate the aggregate of optical pulses that are lined-up without deficiencies, orderly at uniform intervals on the time axis.

The RZ format is a format in which the optical intensity becomes zero once even during a continuous "1" signal. Accordingly, generally, the frequency band of the light that serves as an electric field of light is wide as compared with the NRZ format.

In an RZ format optical pulse signal, the optical pulses expressing the bits that mean "1" always exist individually on the time axis. Accordingly, the optical pulse signal is structured as an aggregation of optical pulses whose full width at half maximum (FWHM) are narrow. On the other hand, an NRZ format optical pulse signal is structured as optical pulses that, when bits meaning "1" appear in continuation, have a continuous wide width during the time that the "1" continues. Therefore, the full width at half maximum of the optical pulses structuring an NRZ format optical pulse signal are, on average, wider than the full width at half maximum of the optical pulses structuring an RZ format optical pulse signal.

Accordingly, the frequency band that an RZ format optical pulse signal occupies (hereinafter also called "frequency spectral band" upon occasion) is wider than the frequency spectral band occupied by an NRZ format optical pulse signal. In the following description, there are cases in which simply the term "spectrum" is used in cases in which there are no need to differentiate between whether it is a spectrum expressed by frequency or a spectrum expressed by wavelength.

When the spectral band is wide, first, due to the group velocity dispersion of the optical fiber that is the signal transmission medium, the effect of waveform distortion, in which the full width at half maximum of the optical pulse on the time axis widens, markedly appears, and the transmission length is thereby limited. Secondly, when taking into consideration the increase in capacity in accordance with wavelength multiplexing systems, in order to suppress crosstalk between channels to which adjacent wavelengths are assigned, the difference in the wavelengths assigned to adjacent channels must be made to be large. In either case, an optical pulse signal of a wide spectral band is not preferable from the standpoint of the efficient utilization of the frequency band by the optical communications network that uses that optical pulse signal.

Thus, methods of narrowing the spectral band of an RZ format optical pulse signal have been proposed. A representative method there among is a method that employs a so-called CS-RZ format that RZ-formats an optical pulse train whose phase serving as an electric field of light is inverted between optical pulses that are adjacent on the time axis. (See, for example, A. Hirano, Y. Miyamoto, S. Kuwahara, M. Tomizawa, and K. Murata, "A Novel Mode-Splitting Detection Scheme in 43-Gb/s CS- and DCS-RZ Signal Transmission", IEEE J. Lightwave Technology, vol. 20, No. 12, pp. 2029-2034, 2002.) The phase that serves as an electric field of light being inverted between optical pulses that are adjacent on the time axis, is synonymous with the phase difference between adjacent optical pulses being $\pi$.

Inverting the phase that serves as an electric field of light between optical pulses that are adjacent on the time axis means that the phase serving as an electric field of light is not continuous, and a phase jumping portion where the phase of the electric field of light suddenly changes by $\pi$ exists between the adjacent optical pulses. Accordingly, the effect of the interference that arises between adjacent optical pulses becomes the effect of offsetting the amplitudes of one another. On the other hand, when the phase that serves as an electric field of light between optical pulses that are adjacent on the time axis is the same phase, the effect of the interference that arises between these optical pulses becomes an effect in which the amplitudes thereof are added together.

In the CS-RZ format, the spectral band can be reduced by about 25% as compared with the usual RZ format in which the phase that serves as an electric field of light between optical pulses that are adjacent on the time axis is the same phase. (Refer to A. Hirano, Y. Miyamoto, S. Kuwahara, M. Tomizawa, and K. Murata, "A Novel Mode-Splitting Detection Scheme in 43-Gb/s CS- and DCS-RZ Signal Transmission", IEEE J. Lightwave Technology, vol. 20, No. 12, pp. 2029-2034, 2002.) Therefore, the CS-RZ format has excellent resistance to waveform distortion due to the group velocity dispersion of the optical fiber, and excellent frequency utilization efficiency. Further, in the CS-RZ format, even if the duty ratio of the optical pulse signal is high, waveform distortion due to interference between optical pulses that are adjacent on the time axis is suppressed more than in the usual RZ format. Therefore, the widths, on the time axis, of the optical pulses structuring the optical pulse signal can be made to be wider than in the usual RZ format. As a result, the spectral band of the electric field of light can be reduced. Namely, by employing a CS-RZ format optical pulse signal, an optical communications system having an excellent long-distance transfer characteristic/frequency utilization efficiency can be realized.

Here, the duty ratio of an optical pulse is the ratio of the full width at half maximum of that optical pulse with respect to the interval between optical pulses that are lined-up adjacent on the time axis (the pulse duration per one bit, also called the "time slot"). Accordingly, the duty ratio being high means that the full width at half maximum of the optical pulse is wide with respect to the time slot. Namely, if the time slot is fixed and the full width at half maximum of the optical pulse is widened, or if the full width at half maximum of the optical pulse is fixed and the time slot is narrowed, the duty ratio becomes high.

The following four methods have been conventionally proposed as methods of generating a CS optical pulse train that are needed in order to generate a CS-RZ format optical pulse signal.

The first method is a method of using a Mach-Zehnder interferometer type LiNbO3 optical intensity modulator (see, for example, A. Hirano, Y. Miyamoto, S. Kuwahara, M. Tomizawa, and K. Murata, "A Novel Mode-Splitting Detection Scheme in 43-Gb/s CS- and DCS-RZ Signal Transmission", IEEE J. Lightwave Technology, vol. 20, No. 12, pp. 2029-2034, 2002.) Hereinafter, the LiNbO3 optical intensity modulator will be referred to upon occasion as the LN optical intensity modulator. This method will be described by using, as an example, CS optical pulse train generation in which the repetition frequency is 40 GHz. First, continuance wave (CW) light, which is produced from a CW light source, is inputted to the LN optical intensity modulator. Then, the DC bias level of the control electric signal supplied to the LN optical intensity modulator (which is a sine wave in most cases) is set to the minimum voltage value of the light transmittance. Further, if the LN optical intensity modulator is modulated by an electric modulation signal, whose repetition frequency is 20 GHz and whose intensity amplitude which is the voltage difference between the maximum and the minimum (the peak-to-peak voltage, also called "Vpp" upon occasion hereinafter) is 2 times the half-wave voltage Vπ, a CS optical pulse train of a repetition frequency of 40 GHz is outputted from the LN optical intensity modulator.

In accordance with the first method, even if the wavelength of the CW light source is changed, the change in the characteristic of the optical pulse is small, and therefore, a high-performance, wavelength-variable CS optical pulse train generating light source can be provided. This is because the wavelength dependence of the optical intensity modulating characteristic of the LN optical intensity modulator is small. Further, the first method also has the advantage that the repetition frequency can be changed easily.

The second method is a method using a two-mode oscillation laser. A two-mode oscillation laser is a laser in which the longitudinal mode of the laser oscillation spectrum is formed from two wavelength components, and ideally, the intensities of these two wavelength components are equal. The light output of a two-mode oscillation laser is a CS optical pulse train, and the time waveform thereof is a sine wave. Further, the repetition frequency of the CS optical pulse train that is outputted from a two-mode oscillation laser coincides with the difference in the optical frequencies of the two oscillation longitudinal modes.

The oscillation light of the two-mode oscillation laser is an optical pulse train of a repetition frequency that is equal to the beat frequency of the two longitudinal mode components. For this reason, the two-mode oscillation laser is called a two-mode beat light source. However, there are cases in which a light source, by which there is obtained output light that is formed from two wavelength components whose wavelength spectra have equal intensities, is called a two-mode beat light source regardless of the structure thereof. Thus, a two-mode beat light source that is realized by a single laser element is called a two-mode oscillation laser. When indicating a general pulse light source including pulse light sources that are structured by combining plural laser elements, including this two-mode oscillation laser, the term two-mode beat light source is used. Namely, two-mode beat light source is a wide concept that includes two-mode oscillation lasers.

As will be described later, among pulse light sources that are structured by combining plural laser elements, there is known a light source of a form in which two semiconductor lasers that oscillate in the longitudinal single mode are phase-synchronously driven, and the two output lights that are outputted from these two semiconductor lasers are combined and outputted. Further, there is known a light source that is structured such that two-mode beat light is obtained by extracting only adjacent two wavelength components among the longitudinal mode components by a wavelength filter, from output light of a mode-locked semiconductor laser having numerous longitudinal mode components.

A two-mode laser oscillation method is known that uses a mode-locked semiconductor laser with which a chirped grating is integrated, and utilizes the dispersion of the chirped grating (refer to, for example, K. Sato, A. Hirano, and N. Shimizu, "Dual mode operation of mode-locked semiconductor lasers for anti-phase pulse generation", Technical Digest of OFC 2000, paper ThW3-1~3-3, 2000). For convenience of explanation, here, three longitudinal modes in the vicinity of the Bragg reflection wavelength of the chirped grating are considered. The frequencies of these three longitudinal modes are, from the low frequency side, fm−1, fm, fm+1. By using the dispersion of the chirped grating, the frequency difference (fm−fm−1) between the (m−1)st order and mth order longitudinal modes, and the frequency difference (fm+1−fm) between the mth and (m+1)st order longitudinal modes, are values that differ more greatly the more that frequency pulling-in due to mode-locking operation does not arise. Here, m is an integer.

When mode synchronization is caused by providing modulation equal to (fm+1−fm) to the mode-locked semiconductor laser, frequency pulling-in does not arise at the (m−1)st order mode, and therefore, the laser does not mode-lock-operate. Namely, the laser two-mode-oscillates.

The above two-mode oscillation laser is not limited to a mode-locked semiconductor laser with which a chirped grating is integrated such as that disclosed in the aforementioned document. Further, the above two-mode oscillation laser is not limited to a mode-locked semiconductor laser. The two-mode oscillation laser can be realized by a laser that integrates a sampled grating (refer to L. A. Johansson, Zhaoyang Hu, D. J. Blumenthal, L. A. Coldren, Y. A. Akulova, and G. A. Fish, "40-GHz Dual-Mode-Locked Widely Tunable Sampled-Grating DBR Laser", IEEE Photon. Technol. Lett., vol. 17, No. 2, pp. 285-287, 2005), or by a self-pulsating distributed feedback semiconductor laser (refer to C. Bobbert, J. Kreissl, L. Molle, F. Raub, M. Rohde, B. Sartorius, A. Umbach, and G. Jacumeit, "Novel Compact 40 GHz PZ-Pulse-Source based on Self-Pulsating PhaseCOMB Lasers", Technical Digest of OFC 2004, paper WL5, 2004). In this case, the structure of the element that includes the diffraction grating formation region of the laser that integrates a sampled grating or the self-pulsating distributed feedback semiconductor laser is optimized so as to realize a two-mode oscillation laser.

The third method is a method using an optical pulse light source and an optical delay interferometer. This method will be described by using, as an example, a case of generating a CS optical pulse train of a repetition frequency of 40 GHz. First, an optical pulse light source is readied that generates and outputs a usual optical pulse train in which optical phases between optical pulses adjacent at a repetition frequency of 20 GHz are uniform. Next, this optical pulse train is branched in two by using an optical branching device or the like. By using a delay optical system, a time delay of 25 ps is provided to one of the optical pulse trains that were branched in two, and simultaneously, an optical phase difference of $\pi$ is provided. Thereafter, by multiplexing both optical pulse trains by using an optical combining device, a CS optical pulse train of a repetition frequency of 40 GHz is generated.

An optical-fiber-type element can be used in the optical branching device and the optical combining device, and in the delay optical system. Further, a method that combines a half mirror and a spatial optical system (see H. Murai, M. Kagawa, H. Tsuji, and K. Fujii, "EA Modulator-Based Optical Multiplexing/Demultiplexing Techniques for 160 Gbit/s OTDM Signal Transmission", IEICE Trans. Electron., vol. E88-C, No. 3, pp. 309-318, 2005) also can be used.

The fourth method is a method of generating a CS optical pulse train by mode-lock-operating a mode-locked DBR (Distributed Bragg Reflector) laser while adjusting the longitudinal mode wavelength of the resonator mode thereof, so that mode-locking operation arises in a longitudinal mode formed from only two wavelength components that have equal intensities (refer to S. Arahira, H. Yaegashi, K. Nakamura, and Y. Ogawa, "Generation of carrier-suppressed broad pulses from model locked DBR laser operating with two carrier wavelengths", Electronics Letters, 12 Oct. 2006, vol. 42, No. 21, pp. 1298-1300). In accordance with the fourth method, it is possible to generate a CS optical pulse train by using a single element, and the device can be made to be more compact and less expensive. Further, because the pulse duration of the optical pulse structuring the CS optical pulse train can be changed in a wide range, the pulse duration of the optical pulse can be set flexibly in accordance with the communications system that is used or the like.

However, the following problems to be solved exist in the CS optical pulse train generating methods of the above-described first through fourth related art.

In accordance with the first method, because a continuance wave light source is required separately from the LN optical intensity modulator, the device itself becomes large. Further, the amplitude Vpp of the modulation voltage required by the LN optical intensity modulator is 2 V$\pi$, where V$\pi$ is the half-wave voltage of the LN optical intensity modulator. The half-wave voltage V$\pi$ of a general LN optical intensity modulator is 5 V to 10 V, and therefore, the amplitude Vpp of the modulation voltage is 10 V to 20 V. When converting to electric power with the impedance of the LN optical intensity modulator being 50Ω, this is a large value of 24 dBm to 30 dBm. Accordingly, the first method is a method necessitating a large amount of consumed electric power.

Supposing a case of utilization in a wavelength multiplex system or the like, a large number of CS optical pulse train generating light sources, which corresponds to the wavelength multiplex number, is required. Accordingly, the amount of consumed electric power being large means that an amount of electric power that increases drastically in accordance with the increase in the number of these CS optical pulse train generating light sources, is necessary. Due thereto, the system itself must become large.

In accordance with the second method, there are the advantages that it is possible to generate a CS optical pulse train by using a single element, and the device can be made to be more compact and less expensive. However, in principle, only a sine wave optical pulse train can be obtained, and flexible setting of the pulse width in accordance with the system specifications cannot be carried out. Further, the controllable width of the wavelength is about several nm which is extremely narrow, and the usable range in practical use is limited.

In accordance with the third method, an optical pulse light source, that has a repetition frequency of a magnitude that is half of the repetition frequency of the CS optical pulse train to be generated, is needed. For example, when generating a CS optical pulse train of a repetition frequency of 40 GHz, an optical pulse light source having a repetition frequency of 20 GHz is needed.

Further, with an optical delay interferometer that is needed in optical phase control between optical pulse trains that have been branched in two, there is the need for highly-precise adjustment corresponding to the order of μm with respect to the optical path lengths of the two branched optical pulse trains. Namely, the structure of the device becomes complex, and a highly-precise optical path length controlling circuit is required. As a result, a device for realizing the third method is large and expensive.

In accordance with the fourth method, the wavelength width over which the wavelength of the CS optical pulse train to be generated can be varied is about several nm which is narrow. Supposing a case in which the CS optical pulse train is applied to a large-capacity communications system in accordance with a wavelength multiplexing method, it is desirable that the wavelength variable range of the optical signal source be such that the wavelength can be varied at least about one band of the frequency band, due to requirements such as combining the wavelength into the prescribed wavelength grid of the system, ensuring a spare light source, and the like. For example, because the frequency band width of the C band is 1535 nm to 1565 nm, realization of the ability to vary the wavelength in a width of about the frequency band width of this C band is desired of a CS optical pulse train generating device.

SUMMARY OF THE INVENTION

The present invention provides a CS optical pulse train generating device in which the optical pulse width, the duty ratio, and the central wavelength can be varied. Further, the present invention provides a CS optical pulse train generating device that can be made compact and in which the amount of consumed electric power is low. Moreover, the present invention provides a CS optical pulse train generating method using the CS optical pulse train generating device.

A first aspect of the present invention is a carrier-suppressed optical pulse train generating device including: a first electric modulation signal generator generating and outputting a first electric modulation signal that is synchronous with a clock signal; a second electric modulation signal generator generating and outputting a second electric modulation signal of a same frequency as the first electric modulation signal and to which a phase difference of δ radians is provided, where δ is a real number satisfying 0≦δ≦π; a two-mode beat light source driven by the first electric modulation signal, and generating and outputting two-mode beat light; and an optical intensity modulator to which the two-mode beat light is inputted, and that optical-intensity-modulates the two-mode beat light, and generates and outputs a carrier-suppressed optical pulse train having numerous longitudinal modes whose longitudinal mode spectra are greater than 2, wherein light transmittance of the optical intensity modulator is modulated by the second electric modulation signal.

A second aspect of the present invention is a carrier-suppressed optical pulse train generating device including: a first electric modulation signal generator generating and outputting a first electric modulation signal that is synchronous with a clock signal; a second electric modulation signal generator generating and outputting a second electric modulation signal of a same frequency as the first electric modulation signal and to which a phase difference of δ radians is provided, where δ is a real number satisfying 0≦δ≦π; and a Bragg reflection semiconductor laser, wherein the Bragg reflection semiconductor laser comprises: first and second sampled grating regions at which are formed sampled gratings that are structured such that a short-period grating is incorporated-in within one period of a long-period grating, and that have a double period structure of a long period and a short period; first and second optical intensity modulating regions having a function of modulating optical intensity; a gain region at which an inverted distribution is formed; and first and second phase adjusting regions at which an equivalent refractive index is variable, wherein a Bragg reflection semiconductor laser structure is formed by disposing, in series, the first optical intensity modulating region, the gain region and the first and second phase adjusting regions, between the first sampled grating region and the second sampled grating region, the second optical intensity modulating region is outside of a region sandwiched by the first sampled grating region and the second sampled grating region, and is structured by being disposed in series and adjacent to either one of the first sampled grating region and the second sampled grating region, a wavelength of oscillation light of a Bragg reflection semiconductor laser structural portion can be varied by changing equivalent refractive indices of the first and second sampled grating regions and the first and second phase adjusting regions, the laser is mode-lock-operated by modulating light transmittance of the first optical intensity modulating region by the first electric modulation signal, and can be made to output a carrier-suppressed optical pulse train, and a duty ratio of an optical pulse structuring the carrier-suppressed optical pulse train can be controlled by modulating light transmittance of the second optical intensity modulating region by the second electric modulation signal.

A third aspect of the present invention is a carrier-suppressed optical pulse train generating method including: a first electric modulation signal generating step generating and outputting, by a first electric modulation signal generator, a first electric modulation signal that is synchronous with a clock signal; a second electric modulation signal generating step generating and outputting, by a second electric modulation signal generator, a second electric modulation signal of a same frequency as the first electric modulation signal and having a phase difference of δ radians, where δ is a real number satisfying 0≦δ≦π; a two-mode beat light generating step driving a two-mode beat light source by the first electric modulation signal, and generating and outputting two-mode beat light that is synchronous with the clock signal; and an optical intensity modulating step optical-intensity-modulating the two-mode beat light by an optical intensity modulator that is driven by the second electric modulation signal, and generating and outputting a carrier-suppressed optical pulse train having numerous longitudinal modes whose longitudinal mode spectra are greater than 2.

A fourth aspect of the present invention is a carrier-suppressed optical pulse train generating method using a Bragg reflection semiconductor laser including: first and second sampled grating regions at which are formed sampled gratings that are structured such that a short-period grating is incorporated-in within one period of a long-period grating, and that have a double period structure of a long period and a short period; first and second optical intensity modulating regions having a function of modulating optical intensity; a gain region at which an inverted distribution is formed; and first and second phase adjusting regions at which an equivalent refractive index is variable, where a Bragg reflection semiconductor laser structure is formed by disposing, in series, the first optical intensity modulating region, the gain region and the first and second phase adjusting regions, between the first sampled grating region and the second sampled grating region, the second optical intensity modulating region is outside of a region sandwiched by the first sampled grating region and the second sampled grating region, and is structured by being disposed in series and adjacent to either one of the first sampled grating region and the second sampled grating region, a wavelength of oscillation light of a Bragg reflection semiconductor laser structural portion can be varied by changing equivalent refractive indices of the first and second sampled grating regions and the first and second phase adjusting regions, the laser is mode-lock-operated by modulating light transmittance of the first optical intensity modulating region, and can be made to output a carrier-suppressed optical pulse train, and a duty ratio of an optical pulse structuring the carrier-suppressed optical pulse train can be controlled by modulating light transmittance of the second optical intensity modulating region, the method including: a first electric modulation signal generating step generating and outputting, by a first electric modulation signal generator, a first electric modulation signal that is synchronous with a clock signal; a second electric modulation signal generating step generating and outputting, by a second electric modulation signal generator, a second electric modulation signal of a same frequency as the first electric modulation signal and having a phase difference of δ radians; a wavelength adjusting step varying a wavelength of oscillation light at a Bragg reflection semiconductor laser structural portion, by changing equivalent refractive indices of the first and second sampled grating regions and the first and second phase adjusting regions; a mode-lock operating step causing mode-locking operation by modulating light transmittance of the first optical intensity modulating region by the first electric modulation signal; and a duty ratio adjusting step controlling a duty ratio of an optical pulse structuring a carrier-suppressed optical pulse train by modulating light transmittance of the second optical intensity modulating region by the second electric modulating signal.

BRIEF DESCRIPTION OF THE DRAWINGS

An exemplary embodiment of the present invention will be described in detail based on the following figures, wherein:

FIG. 5A through FIG. 5C are drawings showing the time waveform of the envelope of electric field of light of two-mode beat light, a time waveform of light transmittance of the optical intensity modulator, and a time waveform of an envelope of electric field of light of a CS optical pulse train, respectively;

FIG. 11A through FIG. 11D are drawings showing a case in which the Bragg reflection wavelengths of the Bragg reflectances of the first and second sampled grating regions are the same, that are provided for explanation of the mechanism by which the wavelength of two-mode beat light, that is generated in an optical resonator of a Bragg reflection semiconductor laser, is determined; and FIG. 12A through FIG. 12D are drawings showing a case in which the Bragg reflection wavelengths of the first and second sampled grating regions are different, that are provided for explanation of the mechanism by which the wavelength of two-mode beat light, that is generated in an optical resonator of a Bragg reflection semiconductor laser, is determined.

DETAILED DESCRIPTION OF THE INVENTION

Figure 1:
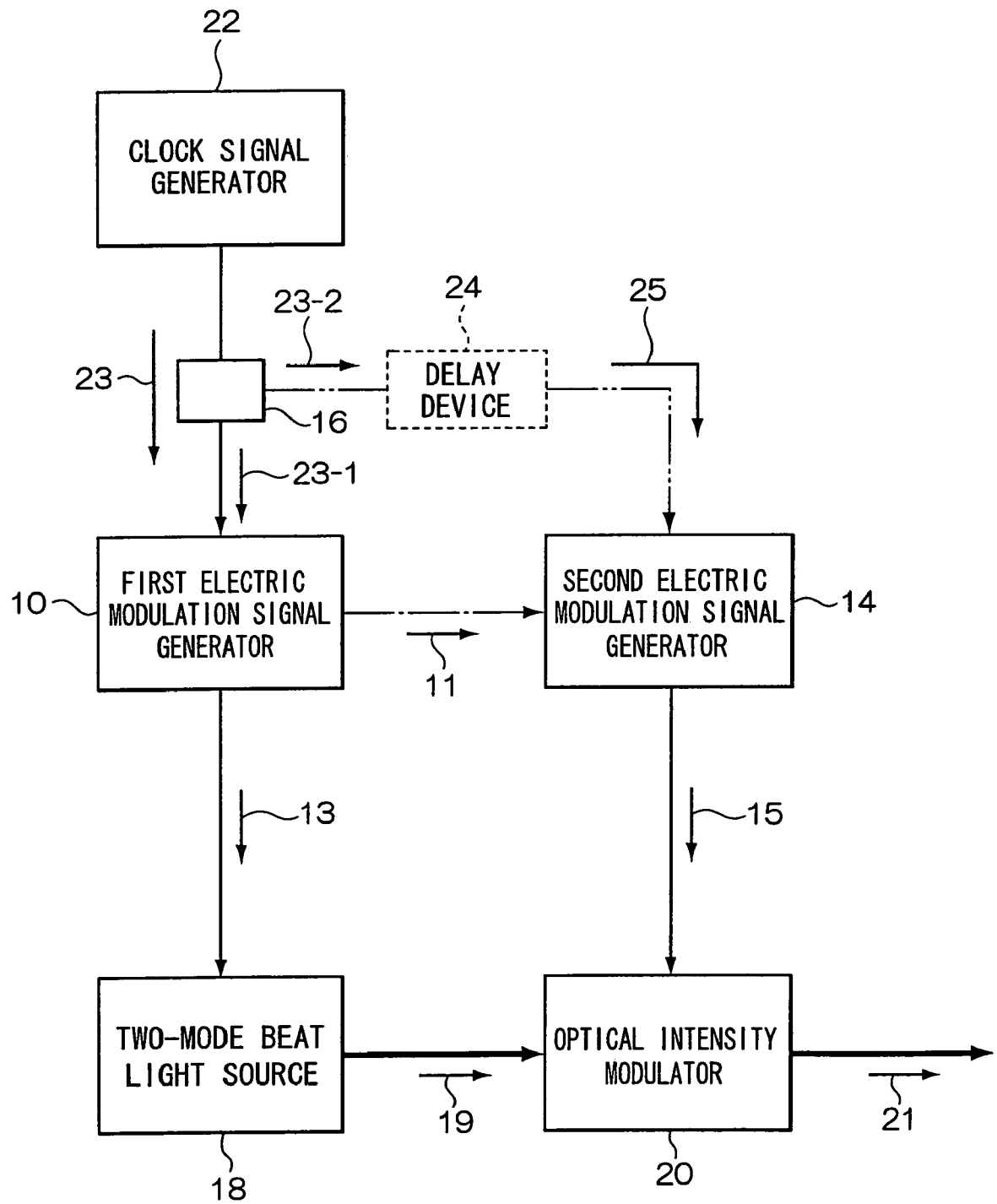
FIG. 1 is a schematic block structural diagram of a first CS optical pulse train generating device of an exemplary embodiment of the present invention.

The inventors of the invention studied methods of making the optical pulse width of a CS optical pulse train variable, by focusing on the fact that two-mode beat light, that has a longitudinal mode spectrum structured by only two longitudinal modes of equal intensities, has a sine-wave-shaped time waveform. As a result, the inventors arrived at changing the optical pulse width by optical-intensity-modulating two-mode beat light by an optical intensity modulator under a particular condition. Namely, the particular condition is the condition of setting, to a value of what extent, the phase difference between the phase of a control signal for optical-intensity-modulating the two-mode beat light and the phase of the two-mode beat light. By methods such as computer simulation and the like, the inventors confirmed that the optical pulse width of a CS optical pulse train can be narrowed by making this phase difference be 0, and can be widened by making this phase difference be π.

In accordance with the gist of the invention of achieving the object of the optical pulse width, the duty ratio and the central wavelength being variable on the basis of the above-described guiding principle that the optical pulse width of a CS optical pulse train is controlled by optical-intensity-modulating two-mode beat light under a particular condition, there is provided a CS optical pulse train generating device and a CS optical pulse train generating method of the following structures.

A first CS optical pulse train generating device of the invention is structured to include a first electric modulation signal generator, a second electric modulation signal generator, a two-mode beat light source, and an optical intensity modulator.

The first electric modulation signal generator generates and outputs a first electric modulation signal that is synchronous with a clock signal. The second electric modulation signal generator generates and outputs a second electric modulation signal of a same frequency as the first electric modulation signal and to which a phase difference of δ radians is provided. The two-mode beat light source is driven by the first electric modulation signal, and generates and outputs two-mode beat light that is synchronous with a clock signal. The two-mode beat light is inputted to the optical intensity modulator, and, by optical-intensity-modulating the two-mode beat light, the optical intensity modulator generates and outputs a CS optical pulse train having numerous longitudinal modes whose longitudinal mode spectra are greater than 2. The light transmittance of the optical intensity modulator is modulated by the second electric modulation signal. Further, δ is a real number that satisfies $0 \leqq \delta \leqq \pi$.

Two-mode beat light means a CS optical pulse train whose longitudinal mode spectrum (wavelength spectrum) has only longitudinal mode components of two wavelengths whose intensities are equal to one another. On the other hand, even in cases in which the longitudinal mode spectrum is formed from numerous longitudinal mode components exceeding 2 wavelength components, it is a CS optical pulse train if it is an optical pulse train in which the phases, that serve as the electric field of light of optical pulses that are adjacent in the intensity time waveform thereof, differ by π. Accordingly, a CS optical pulse train is a wide concept that includes two-mode beat light.

By optical-intensity-modulating the two-mode beat light by the optical intensity modulator, as will be described later, the longitudinal mode spectrum thereof becomes a CS optical pulse train that is formed from numerous longitudinal mode components exceeding two wavelength components. Accordingly, in the following explanation, for simplicity, the light that is obtained by optical-intensity-modulating two-mode beat light will not be called "modulated two-mode beat light", and will be called a CS optical pulse train.

If the first CS optical pulse train generating device of the invention is utilized, a first CS optical pulse train generating method of the invention that will be described hereinafter is realized.

The first CS optical pulse train generating method is structured to include a first electric modulation signal generating step, a second electric modulation signal generating step, a two-mode beat light generating step, and an optical intensity modulating step.

The first electric modulation signal generating step is a step that generates and outputs, by a first electric modulation signal generator, a first electric modulation signal that is synchronous with a clock signal. The second electric modulation signal generating step is a step that generates and outputs, by a second electric modulation signal generator, a second electric modulation signal of a same frequency as the first electric modulation signal and having a phase difference of δ radians. The two-mode beat light generating step is a step that, by driving a two-mode beat light source by the first electric modulation signal, generates and outputs two-mode beat light that is synchronous with a clock signal. The optical intensity modulating step is a step that optical-intensity-modulates the two-mode beat light by an optical intensity modulator that is driven by the second electric modulation signal, and generates and outputs a CS optical pulse train having numerous longitudinal modes whose longitudinal mode spectra are greater than 2.

A second CS optical pulse train generating device of the invention has the feature of being structured by a two-mode beat light source and an optical intensity modulator being monolithically integrated at a same semiconductor substrate, in the above-described first CS optical pulse train generating device. A Bragg reflection semiconductor laser structure is employed in order to realize the function of the two-mode beat light source. Namely, the Bragg reflection semiconductor laser that is used in the second CS optical pulse train generating device is structured by a usual Bragg reflection semiconductor laser structure portion that mode-lock-operates, and a portion having the function of an optical intensity modulator, being integrated monolithically. An optical intensity modulating region, that is for carrying out optical intensity modulation of the two-mode beat light, is attached to the usual Bragg reflection semiconductor laser structure portion.

The light source that is used in the second CS optical pulse train generating device is, as described above, a light source having a particular structure that includes a usual Bragg reflection semiconductor laser structure portion that mode-lock-operates, and a portion having the function of an optical intensity modulator. Here, this light source is simply called a Bragg reflection semiconductor laser. Namely, the second CS optical pulse train generating device of the invention is structured to include a first electric modulation signal generator, a second electric modulation signal generator, and a Bragg reflection semiconductor laser.

The first electric modulation signal generator generates and outputs a first electric modulation signal that is synchronous with a clock signal. The second electric modulation signal generator generates and outputs a second electric modulation signal of a same frequency as the first electric modulation signal and to which a phase difference of δ radians is provided.

The Bragg reflection semiconductor laser has first and second sampled grating regions, first and second optical intensity modulating regions, a gain region at which an inverted distribution is formed, and first and second phase adjusting regions at which an equivalent refractive index is variable. The basic Bragg reflection semiconductor laser structure is structured by the first and second sampled grating regions and the gain region. By adding the first optical intensity modulating region to this basic Bragg reflection semiconductor laser structure, a mode-locked semiconductor laser structure is formed. Providing this mode-locked semiconductor laser structure further with a second optical intensity modulating region for carrying out optical intensity modulation of two-mode beat light is the feature of the Bragg reflection semiconductor laser that the second CS optical pulse train generating device has.

Sampled gratings, that have a double period structure of a long period and a short period that is structured by a short-period grating being incorporated-in within one period of a long-period grating, are formed at the first and second sampled grating regions. The first and second optical intensity modulating regions have the function of modulating optical intensity. Further, the first optical intensity modulating region, the gain region and the first and second phase adjusting regions are disposed in series between the first sampled grating region and the second sampled grating region. Moreover, the second optical intensity modulating region is outside of the region sandwiched by the first sampled grating region and the second sampled grating region, and is disposed in series and adjacent to either one of the first sampled grating region and the second sampled grating region.

By mode-lock-operating the Bragg reflection semiconductor laser by modulating the light transmittance of the first optical intensity modulating region by the first electric modulation signal, the Bragg reflection semiconductor laser can be made to output a CS optical pulse train.

The wavelength of the oscillation light of the Bragg reflection semiconductor laser can be varied by changing the equivalent refractive indices of the first and second sampled grating regions and the first and second phase adjusting regions. The duty ratio of an optical pulse structuring the CS optical pulse train can be controlled by modulating the light transmittance of the second optical intensity modulating region by the second electric modulation signal.

In the second CS optical pulse train generating device, it is suitable that the first optical intensity modulating region is within an optical resonator that is formed by the first sampled grating region and the second sampled grating region, and is disposed at a position that is a center of the optical resonator where a time, until an optical pulse that has passed through the first optical intensity modulating region is Bragg-reflected at the first sampled grating region and returns to the first optical intensity modulating region, and a time, until an optical pulse that has passed through the first optical intensity modulating region is Bragg-reflected at the second sampled grating region and returns to the first optical intensity modulating region, are equal to $N/\Delta f$.

Here, N is an integer of greater than or equal to 1, and $\Delta f$ is a repetition frequency of an optical pulse of the CS optical pulse train that is an optical pulse train.

By using the second CS optical pulse train generating device of the invention, the following second CS optical pulse train generating method of the invention is realized.

The second CS optical pulse train generating method is a CS optical pulse train generating method using a Bragg reflection semiconductor laser, and is structured to include a first electric modulation signal generating step, a second electric modulation signal generating step, a wavelength adjusting step, a mode-lock operating step, and a duty ratio adjusting step. Here, the Bragg reflection semiconductor laser is the Bragg reflection semiconductor laser that the second CS optical pulse train generating device has.

The first electric modulation signal generating step is a step that generates and outputs, by a first electric modulation signal generator, a first electric modulation signal that is synchronous with a clock signal.

The second electric modulation signal generating step is a step that generates and outputs, by a second electric modulation signal generator, a second electric modulation signal of a same frequency as the first electric modulation signal and having a phase difference of $\delta$ radians.

The wavelength adjusting step is a step that varies a wavelength of oscillation light at a Bragg reflection semiconductor laser structural portion, by changing equivalent refractive indices of the first and second sampled grating regions and the first and second phase adjusting regions. The Bragg reflection semiconductor laser structural portion indicates the optical resonator that is formed by the above-described first sampled grating region and second sampled grating region. In the following explanation, this portion will be called the Bragg reflection semiconductor laser structural portion or will be called the optical resonator in accordance with the technical contents that are being described, but the structural portion of the invention that the both indicate is the same portion.

The mode-lock operating step is a step that causes mode-locking operation by modulating light transmittance of the first optical intensity modulating region by the first electric modulation signal.

The duty ratio adjusting step is a step that controls a duty ratio of an optical pulse structuring a CS optical pulse train by modulating light transmittance of the second optical intensity modulating region by the second electric modulating section.

In the first CS optical pulse train generating device and first CS optical pulse train generating method, in order to make small the duty ratio of the CS optical pulse train to be generated, it is suitable that the value of $\delta$ that provides the phase difference between the first electric modulation signal and the second electric modulation signal is set to 0.

Further, in order to make the duty ratio of the CS optical pulse train to be generated even smaller, it is suitable to set the value of $\delta$ to 0, and to set the bias value and the value of the intensity amplitude of the second electric modulation signal such that the minimum value of the light transmittance of the optical intensity modulator is 0.

In the first CS optical pulse train generating device and first CS optical pulse train generating method, in order to make large the duty ratio of the CS optical pulse train to be generated, it is suitable that the value of $\delta$ that provides the phase difference between the first electric modulation signal and the second electric modulation signal is set to $\pi$.

Further, in order to make the duty ratio of the CS optical pulse train to be generated even larger, it is suitable to set the value of $\delta$ to $\pi$, and to set the bias value and the value of the intensity amplitude of the second electric modulation signal such that the extinction ratio, that is defined as the ratio of the maximum value and the minimum value of the light transmittance of the optical intensity modulator, is a maximum value of immediately before occurrence of a splitting phenomenon that divides a peak of a single optical pulse structuring the CS optical pulse train into plural peaks.

In accordance with the first CS optical pulse train generating device, a CS optical pulse train is generated by two-mode beat light, which is outputted from the two-mode beat light source, being optical-intensity-modulated by the optical intensity modulator. The two-mode beat light has a longitudinal mode spectrum structured by only longitudinal mode wavelength components whose intensities are equal, and has a sine-wave-shaped time waveform.

The first electric modulation signal is synchronous with the clock signal, and the two-mode beat light is generated by being driven by the first electric modulation signal. Therefore, the two-mode beat light also is synchronous with the clock signal. Namely, the peak position, that is the maximum position on the time axis of the time waveform of the two-mode beat light, and the peak position, that is the maximum value on the time axis of the time waveform of the first electric modulation signal, coincide. On the other hand, because the optical intensity modulator is driven by the second electric modulation signal, the peak position, that is the maximum position on the time axis of the time waveform of the light transmittance of the optical intensity modulator, and the peak position, that is the maximum position on the time axis of the second electric modulation signal time waveform, coincide.

Accordingly, given that the phase difference between the first electric modulation signal and the second electric modulation signal is $\delta$ radians, if the value of $\delta$ is 0, the peak position on the time axis of the time waveform of the two-mode beat light, and the peak position on the time axis of the time waveform of the light transmittance of the optical intensity modulator, coincide. Further, if the value of $\delta$ is $\pi$, the peak position on the time axis of the time waveform of the two-mode beat light, and the position of the minimum on the time axis of the time waveform of the light transmittance of the optical intensity modulator, coincide.

Although the reason therefore will be described in detail later, the optical pulse width of the CS optical pulse train is most narrow when the value of δ is 0, and is most wide when the value of δ is π. Namely, by varying the value of δ in the range from 0 to π, the optical pulse width of the CS optical pulse train can be controlled, and accordingly, the duty ratio can be changed.

The value of δ can be set arbitrarily by, for example, the known method of controlling the first electric modulation signal generator and the second electric modulation signal generator by a common clock signal, and adjusting, by a delay device, the delay amount of the electric pulse signal outputted from the second electric modulation signal generator. Further, the method of setting the value of δ is not limited to this method, and it is also possible to use the known method of adjusting the phase difference of the clock signals that are supplied to the first electric modulation signal generator and the second electric modulation signal generator. In either case, if it is possible to vary the phase difference between the first electric modulation signal and the second electric modulation signal in the range from 0 to π, any known technique may be used, and which technique to use falls within a matter of design.

In order to effectively control the pulse duration of the optical pulse of the CS optical pulse train to be generated, it is effective to adjust the value of δ, and to control the characteristic of the light transmittance of the optical intensity modulator by adjusting the bias value and the value of the intensity amplitude of the second electric modulation signal as described above. This has been made clear from research based on computer simulation and the like.

On the other hand, when employing, as the two-mode beat light source, a light source of a form that phase-synchronously drives two semiconductor lasers that oscillate in a longitudinal single mode and combines and outputs the two output lights that are outputted from these two semiconductor lasers, the CS optical pulse train generating device at which the wavelength can be varied over a wide range is realized by varying the oscillation wavelengths of the two semiconductor lasers.

Further, the CS optical pulse train generating device at which the wavelength can be varied over a wide range is realized also by using, as the two-mode beat light source, a light source that is structured such that two-mode beat light is obtained by extracting, by a wavelength filter, only adjacent two wavelength components among the longitudinal mode components of outputted light of a mode-locked semiconductor laser having numerous longitudinal mode components. Namely, by changing the wavelengths of the two wavelength components that are extracted, the wavelength of the CS optical pulse train to be generated can be changed. Accordingly, the greater the number of wavelength components that are included in the longitudinal mode of a mode-locked semiconductor laser, the wider the variable wavelength range can be made to be.

The second CS optical pulse train generating device uses the Bragg reflection semiconductor laser in which the function as a two-mode beat light source and the function as an optical intensity modulator are made integral. Accordingly, in accordance with the second CS optical pulse train generating device, a CS optical pulse train generating device that can be made compact and at which a small amount of consumed electric power suffices is realized.

An exemplary embodiment of the invention will be described hereinafter with reference to the drawings. Note that the respective drawings that are provided for explanation of the forms of the device illustrate structural examples relating to the invention, and merely schematically show the arrangement relationships of the respective structural elements to the extent that the invention can be understood, but the present invention is not limited to the illustrated examples.

<First CS Optical Pulse Train Generating Device>
(Structure)

The structure of a first CS optical pulse train generating device relating to the exemplary embodiment of the invention will be described with reference to FIG. 1 and FIG. 2A through FIG. 2E.

FIG. 1 is a schematic block structural diagram of the first CS optical pulse train generating device of the exemplary embodiment of the invention. In FIG. 1, the propagation path of an optical pulse train is shown by the thick lines, and the propagation path of electric signals is shown by the thin lines. The propagation path of the optical pulse train is a spatially joined path that is structured by combining optical waveguides such as optical fibers or the like, or optical elements such as lenses or the like. How to concretely form the propagation path of the optical pulse train is a matter of design and is not essential technical matter of the invention, and therefore, description thereof is omitted.

The first CS optical pulse train generating device of the present exemplary embodiment is structured to include a first electric modulation signal generator 10, a second electric modulation signal generator 14, a two-mode beat light source 18 and an optical intensity modulator 20. Further, the first CS optical pulse train generating device has a clock signal generator 22 that supplies clock signals to the first electric modulation signal generator 10 and the second electric modulation signal generator 14.

The first electric modulation signal generator 10 executes a first electric modulation signal generating step of generating and outputting a first electric modulation signal 13 that is synchronous with a clock signal 23. The second electric modulation signal generator 14 executes a second electric modulation signal generating step of generating and outputting a second electric modulation signal 15 that is the same frequency as the first electric modulation signal and to which a phase difference of δ radians is provided. The time waveforms of the first electric modulation signal 13 and the second electric modulation signal 15 are not limited to sine-wave waveforms, and may be pulse-shaped waveforms.

The clock signal 23 is a clock signal that is the reference for operating the system, originally in the first CS optical pulse train generating device, and also in optical communications systems and the like that are structured by using the first CS optical pulse train generating device. Therefore, the clock signal 23 is upon occasion called a system clock signal.

The two-mode beat light source 18 is driven by the first electric modulation signal 13, and executes a two-mode beat light generating step of generating and outputting two-mode beat light 19 that is synchronous with the clock signal 23. The optical intensity modulator 20 executes an optical intensity modulating step of the two-mode beat light 19 being inputted to the optical intensity modulator 20, and the optical intensity modulator 20 optical-intensity-modulating the two-mode beat light 19 and generating and outputting a CS optical pulse train 21 having numerous longitudinal mode components whose longitudinal mode spectra exceed 2. The light transmittance of the optical intensity modulator 20 is modulated by the second electric modulation signal 15.

Here, "synchronous" in the two-mode beat light generating step means that the frequency and phase of the first electric modulation signal 13, and the repetition frequency and phase of the intensity time waveform of the two-mode beat light 19, coincide. The repetition frequency of the intensity time waveform of the two-mode beat light 19 is equal to the frequency difference of two frequency components in the frequency spectrum of the two-mode beat light 19. Namely, "synchronous" means that the frequency difference of two frequency components in the frequency spectrum of the two-mode beat light 19 coincide with the frequency of the first electric modulation signal 13.

Figure 2D:
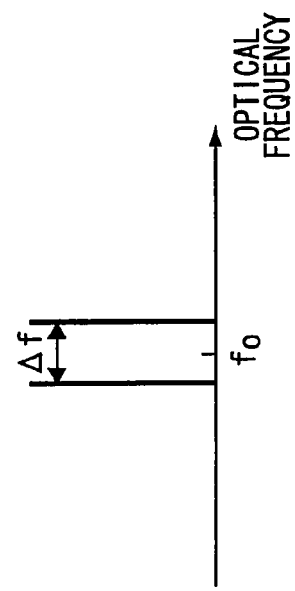
FIG. 2D and FIG. 2E are drawings showing frequency spectra of the two-mode beat light and the CS optical pulse train, respectively.
Figure 2E:
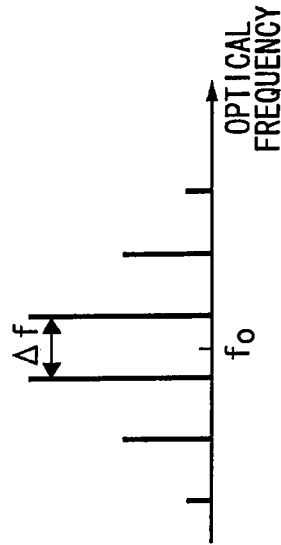
Figure 2A:
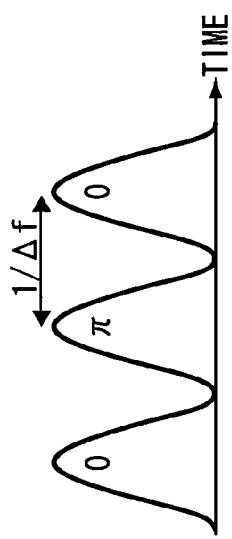
FIG. 2A through FIG. 2C are drawings showing time waveforms of two-mode beat light, a second electric modulation signal and a CS optical pulse train, respectively.
Figure 2B:
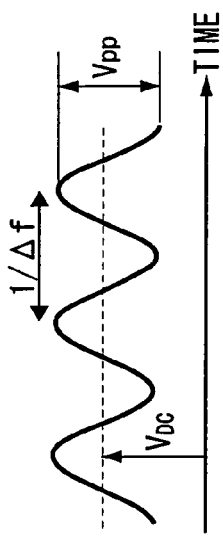
Figure 2C:
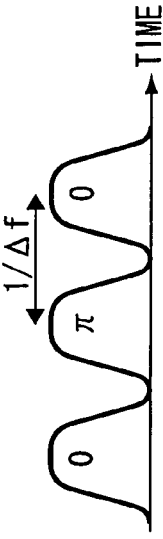

The time waveforms and frequency spectra (longitudinal mode spectra) of the two-mode beat light 19, the second electric modulation signal 15 and the CS optical pulse train 21 will be described with reference to FIG. 2A through FIG. 2E. FIG. 2A through FIG. 2C are drawings showing the time waveforms of the two-mode beat light 19, the second electric modulation signal 15 and the CS optical pulse train 21, respectively. Further, FIG. 2D and FIG. 2E are drawings showing the frequency spectra of the two-mode beat light 19 and the CS optical pulse train 21, respectively.

In FIG. 2A through FIG. 2C, the horizontal axis shows time on an arbitrary scale, and optical intensity is shown in the vertical axis direction on an arbitrary scale. Further, in FIG. 2D and FIG. 2E, the horizontal axis shows optical frequency on an arbitrary scale, and optical intensity is shown in the vertical axis direction on an arbitrary scale.

FIG. 2A is a drawing showing the time waveform of the optical intensity of the envelope of the electric field of light forming the two-mode beat light 19. The time waveform, which is observed as changes in the optical intensity, is expressed as the envelope of a time waveform obtained by squaring the absolute value of the amplitude of the electric field vector of the light serving as the electric field of light. Accordingly, in the following explanation, "time waveform of the optical intensity of the optical pulse" or merely "time waveform of the optical pulse" means the envelope of the time waveform obtained by squaring the absolute value of the amplitude of the electric field vector of the light.

The two-mode beat light 19 is an optical pulse train in which the phases serving as the electric field of light of the optical pulses that are lined-up adjacent on the time axis have the relationship of being phases that are opposite one another. Namely, there is the relationship that the phase difference between the both serving as electric field of light of optical pulses that are lined-up adjacent on the time axis is equal to π. This is expressed by "0" and "π" alternately at the peak positions of the optical pulses in FIG. 2A. Namely, this means that the phases serving as the electric field of light of mutually adjacent optical pulses differ by π.

As shown in FIG. 2D, the frequencies of the two frequency components of the frequency spectrum of the two-mode beat light 19 are f0+Δf/2 and f0−Δf/2. Here, f0 is the frequency serving as the electric field of light of the two-mode beat light 19, and Δf is the repetition frequency of the optical pulses of the two-mode beat light 19 that is an optical pulse train. Further, the frequency serving as the electric field of light of the CS optical pulse train 21 that is generated by the two-mode beat light 19, that is outputted from the optical intensity modulator 20, being optical-intensity-modulated, is f0. The repetition frequency of the optical pulses of the CS optical pulse train 21 is Δf.

As shown in FIG. 2B, the bias voltage of the second electric modulation signal 15 is set to VDC, and the intensity amplitude is set to Vpp. Because the phases of the two-mode beat light 19 and the second electric modulation signal 15 are illustrated as the same phases in FIG. 2A and FIG. 2B, the peak positions of the both time waveforms coincide. Generally, the phases of the two-mode beat light 19 and the second electric modulation signal 15 can be varied within a range from 0 to π radians.

As shown in FIG. 2C, the period and phase of the time waveform of the CS optical pulse train 21 are the same as the two-mode beat light 19, but the pulse duration of the optical pulses differs. FIG. 2C illustrates a case in which the pulse duration of the optical pulses is wide. However, the pulse duration of the optical pulses can be changed in accordance with the extent to which the phase difference between the two-mode beat light 19 and the second electric modulation signal 15 is set.

The difference that is clear from comparing the frequency spectra shown in FIG. 2D and FIG. 2E is as follows. Namely, the difference in the respective frequency spectrum structures of the two-mode beat light 19 shown in FIG. 2D and the CS optical pulse train 21 shown in FIG. 2E is that the frequency components of the frequency spectrum of the two-mode beat light 19 are the two components of f0+Δf/2 and f0−Δf/2, whereas the frequency components of the CS optical pulse train 21 have, in addition to f0+Δf/2 and f0−Δf/2, numerous modulation sideband components of frequencies that are separated, by integer multiples of Δf, from the frequencies of these frequency components.

Any of various light sources can be used as the two-mode beat light source 18 in accordance with the convenience thereof in terms of design. For example, the two-mode oscillation laser disclosed in the aforementioned publication can be used. Further, the combined output of two single longitudinal mode semiconductor lasers whose phases are synchronized can also be used as the two-mode beat light source. In this case, distributed feedback semiconductor lasers (DFB lasers: distributed feedback lasers) or Bragg reflection semiconductor lasers (DBR lasers: distributed Bragg reflector lasers) are used as the single longitudinal mode semiconductor lasers.

Further, cases in which two adjacent longitudinal mode components are extracted by a wavelength filter or the like from an optical pulse train outputted from a mode-locked laser that is mode-lock-operated by the first electric modulation signal 13, or from numerous longitudinal mode components having optical signals that are optical-intensity-modulated or phase-modulated synchronously with the first electric modulation signal 13 similarly, also are two-mode beat light sources.

The method for synchronizing the phases of the first electric modulation signal 13 and the second electric modulation signal 15 and, further, making the phase difference between the both be δ radians, is implemented as follows.

In a first method, first, the clock signal 23 that is outputted from the clock signal generator 22 is inputted to the first electric modulation signal generator 10, and first electric modulation signals 11 and 13 of the same phase as the clock signal 23 are generated and outputted. Next, the first electric modulation signal 11 is inputted to the second electric modulation signal generator 14, a phase difference of δ radians is added to the first electric modulation signal 11, and the second electric modulation signal 15 is generated and outputted. In this case, the second electric modulation signal 15 is generated on the basis of the first electric modulation signal 11 of the same phase as the first electric modulation signal 13. Therefore, the first electric modulation signal 13 and the second electric modulation signal 15 are synchronous, and the phase difference between the both is δ radians.

In the first method, the second electric modulation signal generator 14 has the function of adding a phase delay of δ radians to the first electric modulation signal 11 and generating the second electric modulation signal 15. If this function of the second electric modulation signal generator 14 is focused upon, the second electric modulation signal generator 14 can be structured by a phase delay device having only a phase delaying function. However, as will be described later, in addition to adding a phase delay to the inputted first electric modulation signal, the second electric modulation signal generator 14 must also have the function of changing the bias value and the value of the intensity amplitude of the first electric modulation signal. Accordingly, the second electric modulation signal generator 14 is not a mere phase delay device, and must function to change the bias value and the value of the intensity amplitude of the inputted electric signal.

Further, the first electric modulation signal 13 and the second electric modulation signal 15 can be generated as follows. Namely, in a second method, first, the clock signal 23 that is outputted from the clock signal generator 22 is branched in two into a clock signal 23-1 and a clock signal 23-2 by a branching device 16. Next, the clock signal 23-1 is inputted to the first electric modulation signal generator 10, and the clock signal 23-2 is inputted to a delay device 24. At the delay device 24, a phase difference of δ radians is added to the clock signal 23-2 and a clock signal 25 is generated, and this clock signal 25 is inputted to the second electric modulation signal generator 14. By doing so, the first electric modulation signal 13 of the same phase as the clock signal 23-1 is generated and outputted from the first electric modulation signal generator 10. Further, the second electric modulation signal 15 of the same phase as the clock signal 25 is generated and outputted from the second-electric modulation signal generator 14. In the case of the second method, the clock signal 23-1 and the clock signal 25 are made synchronous, and the phase difference between the both is δ radians. Accordingly, the first electric modulation signal 13 and the second electric modulation signal 15 are made synchronous, and the phase difference between the both is δ radians.

A concrete example for generating the first electric modulation signal 13 and the second electric modulation signal 15 will be described. Here, a case of generating a CS optical pulse train of a repetition frequency of 40 GHz will be considered. However, it is obvious that cases of generating CS optical pulse trains of repetition frequencies other than 40 GHz can be implemented. When generating a CS optical pulse train of a repetition frequency of other than 40 GHz, instead of a 40 GHz electric signal oscillator, it suffices to utilize an electric signal oscillator that generates and outputs an electric pulse signal that is equal to the repetition frequency of the CS optical pulse train to be generated.

First, an electric pulse signal of 40 GHz that is synchronous with the system clock signal (the clock signal 23) is generated by using a 40 GHZ electric signal oscillator. This 40 GHz electric signal oscillator corresponds to the first electric modulation signal generator 10. Next, the output from the 40 GHz electric signal oscillator is branched in two at a power divider. One of the signals branched in two is inputted to a phase shifter.

When utilizing such a structure, the first electric modulation signal 13 is outputted from the branch output port of the power divider that is not connected to the phase shifter. Further, the second electric modulation signal 15 is outputted from the output port of the phase shifter. Namely, the first electric modulation signal 13 and the second electric modulation signal 15 can be generated and outputted by the above-described first method.

In accordance with any of the above-described methods, the phases of the first electric modulation signal 13 and the second electric modulation signal 15 can be made to be synchronous, and further, the phase difference between the both can be made to be δ radians. In FIG. 1, the electrical path used in the above-described first method is shown by the one-dot chain line, and the electrical path used in the second method is shown by the two-dot chain line.

Operation

Operation of the first CS optical pulse train generating device of the present exemplary embodiment will be described with reference to FIG. 3A through FIG. 3C and FIG. 4A through FIG. 4C. In FIG. 3A through FIG. 3C and FIG. 4A through FIG. 4C, time is shown on the horizontal axis on an arbitrary scale, and optical intensity is shown on the vertical axis on an arbitrary scale.

Figure 3A:
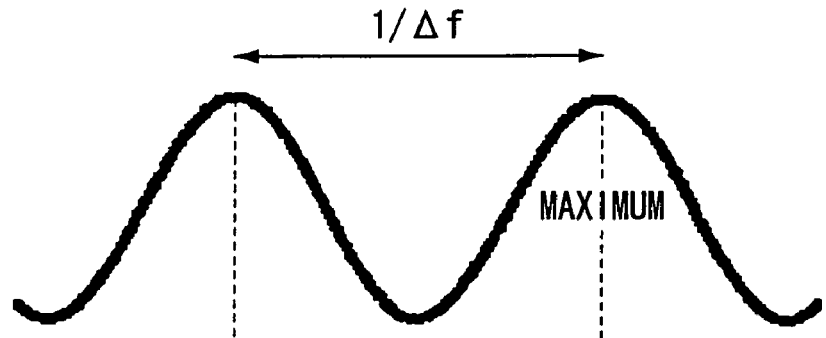
FIG. 3A is a drawing showing a time waveform of two-mode beat light in a case in which a phase difference between a first electric modulation signal and the second electric modulation signal is 0 radians.
Figure 3B:
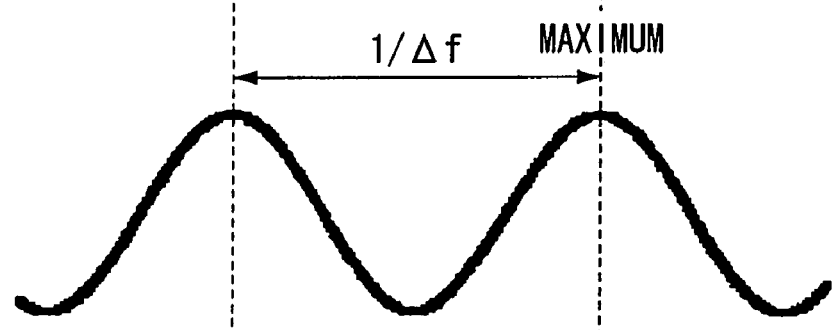
FIG. 3B is a drawing showing a time waveform of light transmittance of an optical intensity modulator in a case in which the phase difference between the first electric modulation signal and the second electric modulation signal is 0 radians.
Figure 3C:
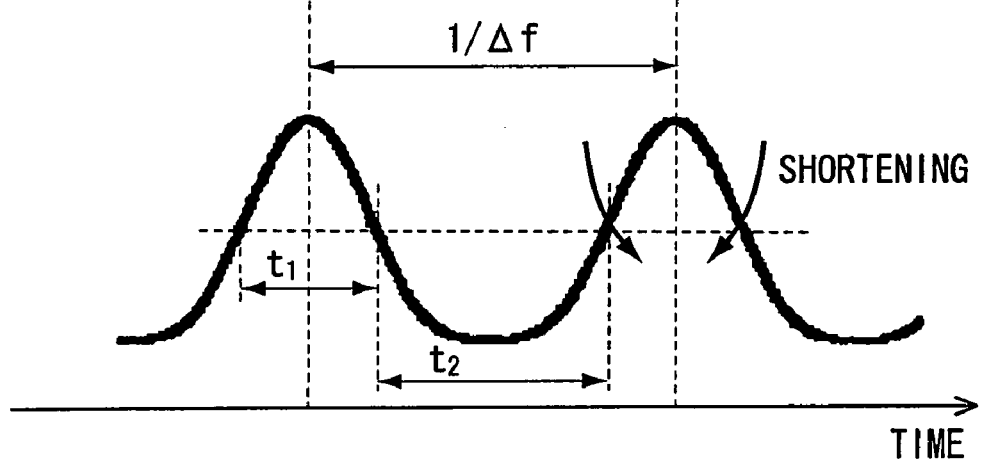
FIG. 3C is a drawing showing a time waveform of a CS optical pulse train in a case in which the phase difference between the first electric modulation signal and the second electric modulation signal is 0 radians.
Figure 4A:
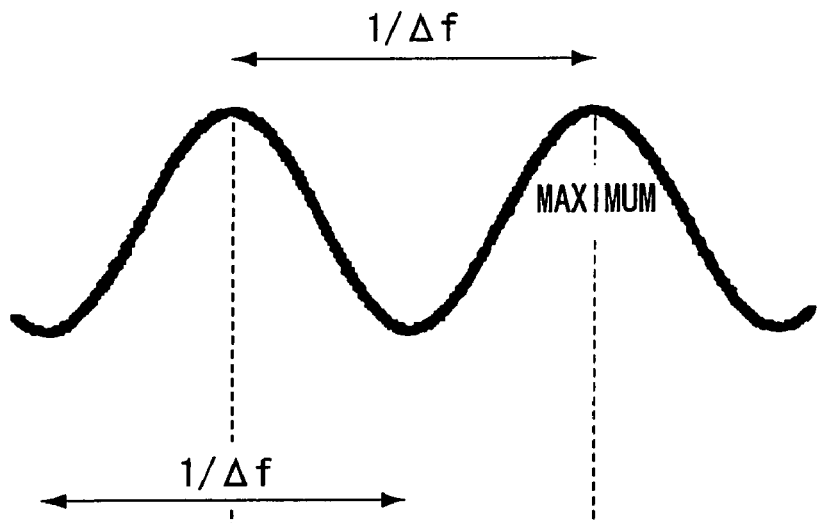
FIG. 4A is a drawing showing a time waveform of two-mode beat light in a case in which the phase difference between the first electric modulation signal and the second electric modulation signal is π radians.
Figure 4B:
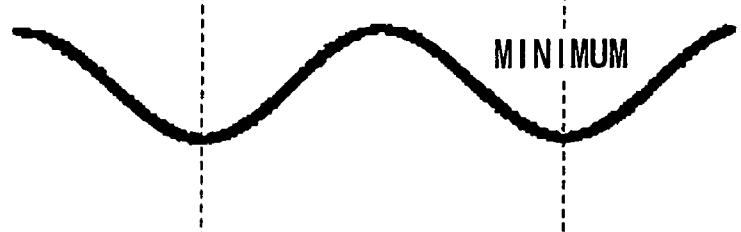
FIG. 4B is a drawing showing a time waveform of light transmittance of the optical intensity modulator in a case in which the phase difference between the first electric modulation signal and the second electric modulation signal is π radians.
Figure 4C:
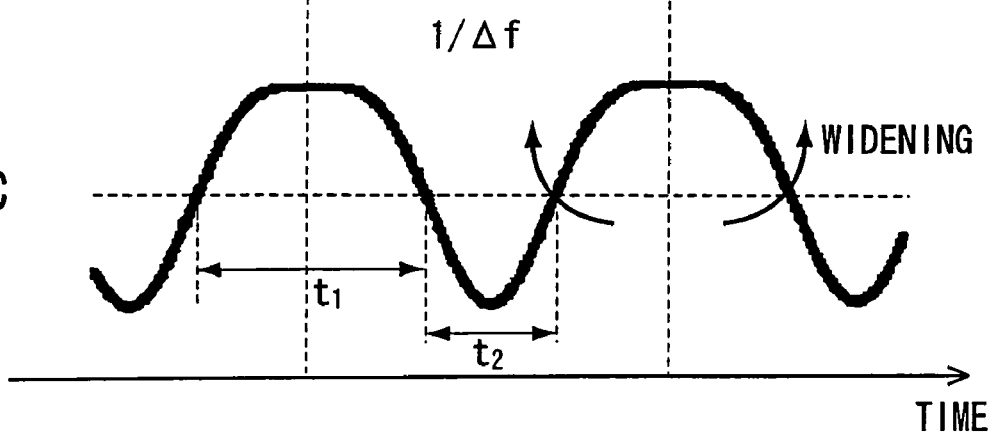
FIG. 4C is a drawing showing a time waveform of a CS optical pulse train in a case in which the phase difference between the first electric modulation signal and the second electric modulation signal is π radians.

FIG. 3A through FIG. 3C illustrate the light transmittances of the two-mode beat light 19 and the optical intensity modulator 20 and the time waveform of the CS optical pulse train 21, respectively, in a case in which the phase difference between the first electric modulation signal 13 and the second electric modulation signal 15 is 0 radians. FIG. 4A through FIG. 4C illustrate the light transmittances of the two-mode beat light 19 and the optical intensity modulator 20 and the time waveform of the CS optical pulse train 21, respectively, in a case in which the phase difference between the first electric modulation signal 13 and the second electric modulation signal 15 is 0 π radians.

Here, in order to explain the present exemplary embodiment simply, it is supposed that the time change of the light transmittance of the optical intensity modulator 20 is provided by a sine wave. However, the present exemplary embodiment is not limited to a case in which the time change of the light transmittance of the optical intensity modulator 20 is provided by a sine wave, and similar effects are obtained even in a case in which the time change is provided by a pulse-shaped waveform.

As shown in FIG. 3A and FIG. 3B, in a case in which the phase difference of the first electric modulation signal 13 and the second electric modulation signal 15 is 0 radians, the maximum position on the time axis of the time waveform of the two-mode beat light 19, and the maximum position on the time axis of the time waveform of the light transmittance of the optical intensity modulator 20, coincide. The time waveform of the CS optical pulse train 21 is provided by the product of the time waveform of the two-mode beat light 19 and the time waveform of the light transmittance of the optical intensity modulator 20. Accordingly, in a case in which the phase difference of the first electric modulation signal 13 and the second electric modulation signal 15 is 0 radians, the CS optical pulse train 21 receives greater damping of optical intensity at the optical intensity modulator 20 in a vicinity of the minimum as compared with a vicinity of the maximum of the time waveform of the CS optical pulse train 21. Namely, in this case, at the time waveform of the CS optical pulse train 21, a contracting phenomenon of the optical pulse width occurs.

The proportion of contraction of the optical pulse width varies in accordance with the extinction ratio of the time waveform of the light transmittance of the optical intensity modulator 20, i.e., the ratio of the maximum value and the minimum value of the light transmittance of the optical intensity modulator 20 (the value obtained by dividing the maximum value by the minimum value). In most optical intensity modulators that are used in practice, the extinction ratio of the optical intensity modulation can be controlled by the intensity modulation current or the intensity modulation voltage of the electric modulation signal provided to the optical intensity modulator. Accordingly, by varying the bias value that is a DC component and the value of the intensity amplitude that is an AC component of the second electric modulation signal 15, the extinction ratio of the optical intensity modulation can be controlled.

The second electric modulation signal 15 is a modulation signal provided by the sum of the DC component and the AC signal component. Therefore, the device can be structured by combining an electric pulse signal generator that generates an AC signal component, and a DC power source that can supply constant current or constant voltage that generates a DC component. Namely, it suffices to structure the device by combining and outputting, at a combining device, an AC signal outputted from an electric pulse signal generator and a DC component outputted from a DC power source. Changing the bias value that is the DC component of the second electric modulation signal 15 can be handled by changing the output value of the DC power source. Further, changing the value of the intensity amplitude of the AC component can be handled by changing the intensity amplitude of the output value of the electric pulse signal generator.

On the other hand, in a case in which the phase difference of the first electric modulation signal 13 and the second electric modulation signal 15 is $\pi$ radians, as shown in FIG. 4A and FIG. 4B, the maximum position on the time axis of the time waveform of the two-mode beat light 19, and the minimum position on the time axis of the time waveform of the light transmittance of the optical intensity modulator 20, coincide. Also in the case in which the phase difference of the first electric modulation signal 13 and the second electric modulation signal 15 is $\pi$ radians, as described above, the time waveform of the CS optical pulse train 21 is provided by the product of the time waveform of the two-mode beat light 19 and the time waveform of the light transmittance of the optical intensity modulator 20. Accordingly, in this case, the CS optical pulse train 21 receives greater damping of optical intensity at the optical intensity modulator 20 in a vicinity of the maximum as compared with a vicinity of the minimum of the time waveform of the CS optical pulse train 21. Namely, in this case, at the time waveform of the CS optical pulse train 21, an expanding phenomenon of the optical pulse width occurs.

In the same way as in the above-described case of contraction of the optical pulse width, the proportion of expansion of the optical pulse width as well varies in accordance with the extinction ratio of the light transmittance of the optical intensity modulator 20. Accordingly, by varying the bias value that is a DC component and the value of the intensity amplitude that is an AC component of the second electric modulation signal 15, the extinction ratio of the optical intensity modulator can be controlled.

Namely, in either case of contraction of the optical pulse width or expansion of the optical pulse width, the value of $\delta$ is set to 0, and the extinction ratio of the optical intensity modulator can be controlled by varying the relationship of the magnitudes of the proportion (t1/(t1+t2)) occupied by width t1 of a time band that takes a value larger than an intermediate value between the maximum value and the minimum value of the light transmittance, and the proportion (t2/(t1+t2)) occupied by width t2 of a time band that takes a value smaller than the intermediate value between the maximum value and the minimum value of the light transmittance, during one period (1/$\Delta$f=(t1+t2)) of the light transmittance of the optical intensity modulator.

The switching of the contracting of the optical pulse width and the expanding of the optical pulse width may be carried out by selecting whether the maximum position on the time axis of the time waveform of the two-mode beat light 19 is made to match the maximum position or the minimum position on the time axis of the time waveform of the light transmittance of the optical intensity modulator 20. This selection is easily executed by providing a phase difference of 0 or $\pi$, with respect to the first electric modulation signal 13, to the second electric modulation signal 15.

The shape of the time waveform of the CS optical pulse train 21 will be described with reference to FIG. 5A through FIG. 5C. FIG. 5A is a drawing showing the time waveform of the envelope of the electric field of light of the two-mode beat light 19. FIG. 5B is a drawing showing the time waveform of the light transmittance of the optical intensity modulator 20. FIG. 5C is a drawing showing the time waveform of the envelope of the electric field of light of the CS optical pulse train 21. Hereinafter, the time waveform of the envelope of the electric field of light will be called the amplitude waveform upon occasion.

In FIG. 5A through FIG. 5C, time is shown on the horizontal axis on an arbitrary scale. Further, the magnitude of the electric field vector of the light is shown on an arbitrary scale on the vertical axes of FIG. 5A and FIG. 5C. The light transmittance of the optical intensity modulator 20 is shown on the vertical axis of FIG. 5B on an arbitrary scale.

Because the two-mode beat light 19 is the most typical CS optical pulse train, the phase of the electric field of light at the maximum position of the envelope of the electric field of light thereof, and the phase of the electric field of light at the minimum position, differ by $\pi$. Namely, the values of the phase of the electric field of light at the maximum positions and minimum positions are respectively 0, $\pi$, 0, $\pi$, . . . . The values of the amplitude of the electric field of light at the maximum positions and the minimum positions are in the relationship of being positive and negative or negative and positive, respectively. The amplitude waveform of the envelope of the electric field of light of the CS optical pulse train 21 outputted from the optical intensity modulator 20 is provided to the two-mode beat light 19 by the product of the amplitude waveform of the envelope of the electric field of light and the square root of the light transmittance of the optical intensity modulator 20.

Accordingly, in the same way as the two-mode beat light 19, also at the amplitude waveform of the envelope of the electric field of light of the CS optical pulse train 21, the values of the electric field vectors of the electric field of light at the maximum position and the minimum position are in the relationship of being positive and negative or negative and positive, respectively. Namely, even if the two-mode beat light 19 is optical-intensity-modulated, the nature thereof as a CS optical pulse train is not deteriorated.

The effects achieved by the first CS optical pulse train generating device of the invention will be described on the basis of FIG. 6A through FIG. 6D, with reference to results of computer simulation. In the following description, for simplicity and to the extent that it does not cause misunderstanding, there are cases in which the first electric modulation signal generator 10, the second electric modulation signal generator 14, the optical intensity modulator 20 are not written as such, and the numerals indicating the respective blocks such as 10, 14, 20 that show the correspondence with the block structural diagram of FIG. 1 are omitted, and these elements are written as the first electric modulation signal generator, the second electric modulation signal generator, the optical intensity modulator.

Figure 6A:
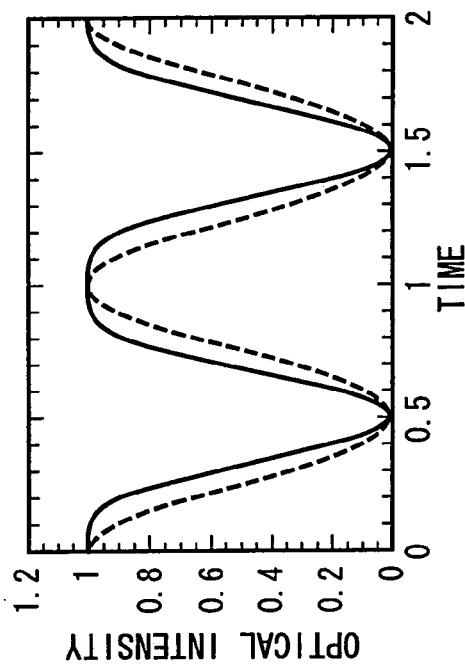
FIG. 6A and FIG. 6B are drawings showing optical intensity time waveforms of CS optical pulse trains, which are provided for explanation of the features of the optical intensity time waveforms and frequency spectra of CS optical pulse trains on the basis of differences in the extinction ratios of the optical intensity modulator.
Figure 6B:
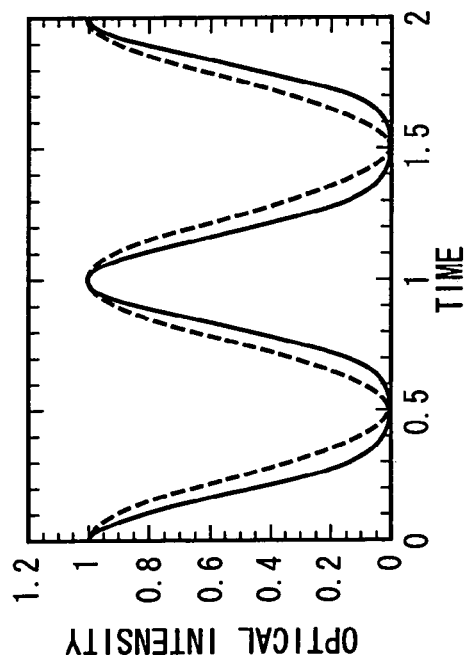
Figure 6C:
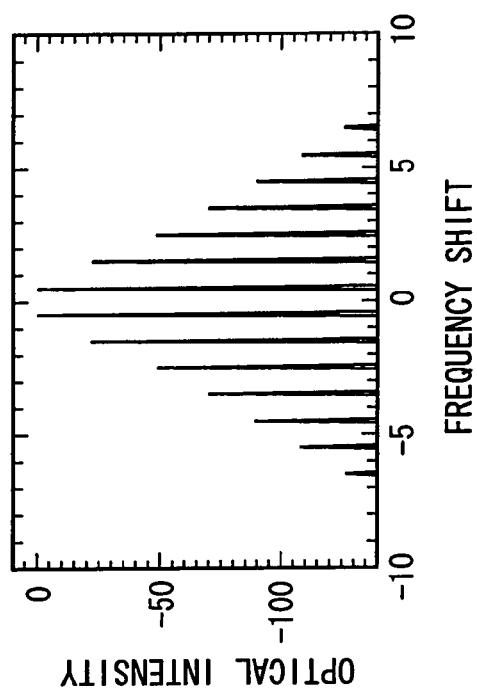
FIG. 6C and FIG. 6D are drawings showing the frequency spectra of the CS optical pulse trains, which are provided for explanation of the features of the optical intensity time waveforms and the frequency spectra of the CS optical pulse trains on the basis of differences in the extinction ratios of the optical intensity modulator.
Figure 6D:
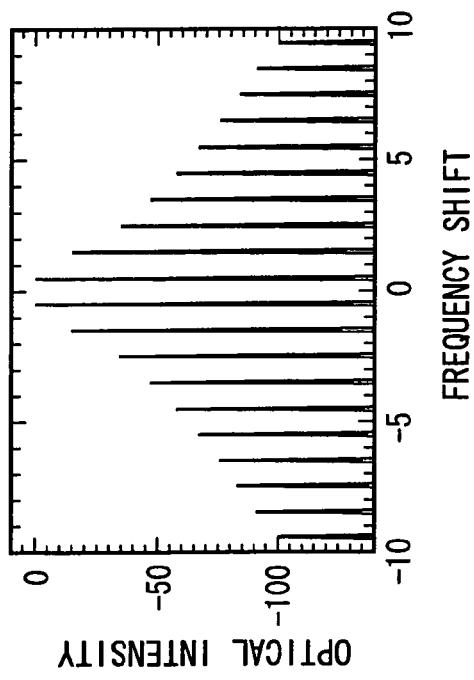

FIG. 6A through FIG. 6D are drawings provided for explanation of the optical intensity time waveform and the frequency spectrum of the CS optical pulse train. FIG. 6A and FIG. 6B are drawings showing optical intensity time waveforms of the CS optical pulse train, and time that is standardized with respect to the period (1/Δf) of the clock signal is marked on the horizontal axis. Further, optical intensity is standardized with respect to the optical peak intensity and marked on the vertical axis. FIG. 6C and FIG. 6D are drawings showing frequency spectra of the CS optical pulse train. The frequency shift amount is standardized and marked on the horizontal axis, and the optical intensity is standardized and marked on the vertical axis. The frequency shift amount is a value, in the longitudinal mode frequency spectrum, that shows the frequency f0 of the electric field of light of the CS optical pulse train being coordinate-converted to 0. Namely, a value corresponding to Δf/2 for the frequency f0+Δf/2, and a value corresponding to −Δf/2 for the frequency f0−Δf/2 are written on the horizontal axis.

FIG. 6A and FIG. 6C are drawings showing the optical intensity time waveform and the frequency spectrum of the CS optical pulse train respectively, in a case in which the extinction ratio of the optical intensity modulator is 10 dB and the phase difference δ between the first electric modulation signal and the second electric modulation signal is set to 0 radians. Further, FIG. 6B and FIG. 6D are drawings showing the optical intensity time waveform and the frequency spectrum of the CS optical pulse train, in a case in which the extinction ratio of the optical intensity modulator is 3 dB and the phase difference δ between the first electric modulation signal and the second electric modulation signal is set to π radians. The extinction ratio of the optical intensity modulator is the ratio of the maximum value and the minimum value of the light transmittance of the optical intensity modulator. In FIG. 6A and FIG. 6B, the dashed lines show the optical intensity time waveforms of the two-mode beat light, and the solid lines show the optical intensity time waveforms of the CS optical pulse train.

As shown in FIG. 6A and FIG. 6C, in a case in which the phase difference δ between the first electric modulation signal and the second electric modulation signal is 0 radians, a CS optical pulse train in which the pulse duration of the optical pulse is contracted is generated. As a result, the amplitude time waveform of the two-mode beat light is a sine wave. Therefore, the duty ratio of the optical intensity time waveform of the two-mode beat light is 50%, and the duty ratio of the optical intensity time waveform of the generated CS optical pulse train is 37%.

On the other hand, as shown in FIG. 6B and FIG. 6D, in a case in which the phase difference δ between the first electric modulation signal and the second electric modulation signal is π radians, a CS optical pulse train in which the pulse duration of the optical pulse is expanded is generated. As a result, the duty ratio of the optical intensity time waveform of the generated CS optical pulse train is 64%, which is a larger value than the 50% duty ratio of the optical intensity time waveform of the two-mode beat light.

Further, as shown in FIG. 6C and FIG. 6D, the frequency spectrum of the generated CS optical pulse train does not have a frequency component serving as an electric field of light at the position where the frequency shift amount is 0, and exhibits a waveform in which modulation sidebands of the interval Δf widen symmetrically to the left and the right. This shows that the optical pulse train outputted from the optical intensity modulator is a CS optical pulse train.

As described above, in order to make the duty ratio of the CS optical pulse train to be generated small, it suffices to set the value of δ, which provides the phase difference between the first electric modulation signal and the second electric modulation signal, to 0. Further, in order to make the duty ratio large, it suffices to set the value of δ to π.

The effects provided to the operation of modulating the duty ratio of the CS optical pulse train generated by the first CS optical pulse train generating device, that are obtained by controlling the extinction ratio of the light transmittance of the optical intensity modulator, will be explained with reference to FIG. 7A and FIG. 7B on the basis of results verified by computer simulation.

Figure 7B:
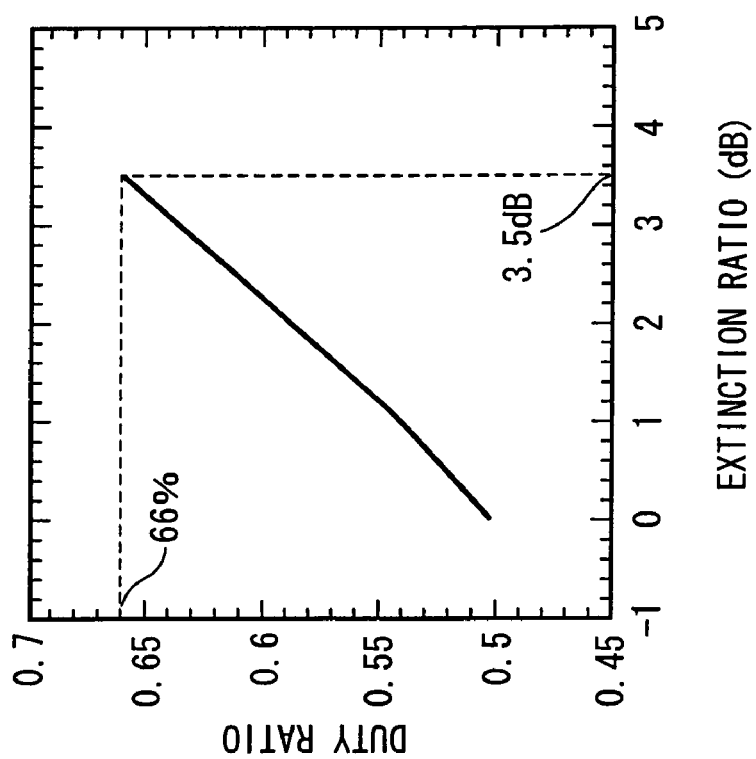
FIG. 7B is a drawing showing dependence, on the extinction ratio of the optical intensity modulator, of the duty ratio of a CS optical pulse train, in a case in which the value of δ that provides a phase difference between the first electric modulation signal and the second electric modulation signal is π radians.
Figure 7A:
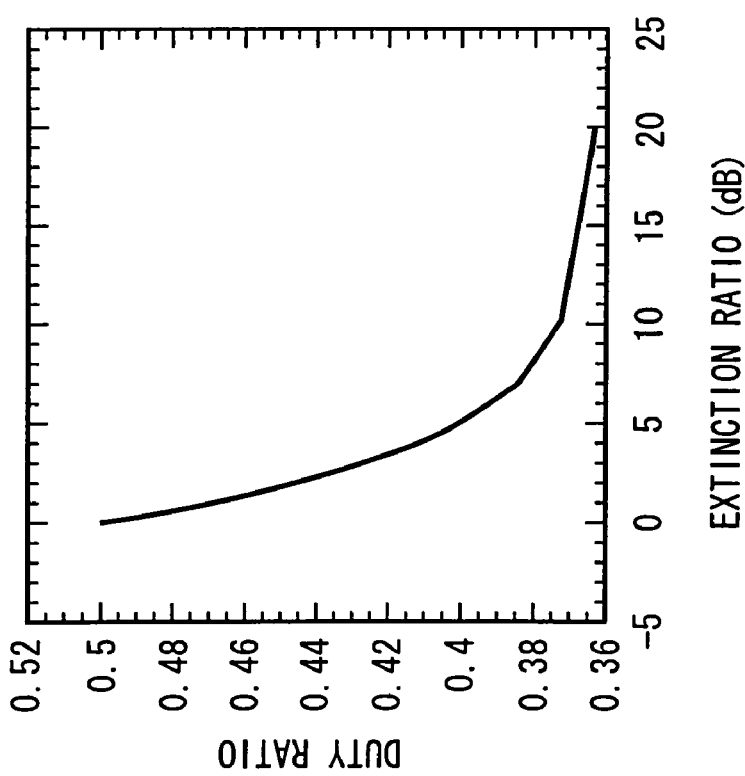
FIG. 7A is a drawing showing dependence, on the extinction ratio of the optical intensity modulator, of the duty ratio of a CS optical pulse train, in a case in which a value of δ that provides a phase difference between the first electric modulation signal and the second electric modulation signal is 0 radians.

FIG. 7A and FIG. 7B are drawings showing the dependence of the duty ratio of the CS optical pulse train on the extinction ratio of the optical intensity modulator. The extinction ratio is marked in dB on the horizontal axis, and the duty ratio is marked on the vertical axis. FIG. 7A shows the dependence, on the extinction ratio of the optical intensity modulator, of the duty ratio of the CS optical pulse train in a case in which the value of δ that provides the phase difference between the first electric modulation signal and the second electric modulation signal is 0 radians. Further, FIG. 7B shows the dependence, on the extinction ratio of the optical intensity modulator, of the duty ratio of the CS optical pulse train in a case in which the value of δ is π radians.

As shown in FIG. 7A, when the value of δ is 0 radians, the duty ratio decreases monotonically in accordance with the increase in the extinction ratio of the optical intensity modulator. When the limit value is determined in a case in which the extinction ratio is infinite, it is confirmed that the duty ratio can be reduced to 36%. When the extinction ratio is infinite, the minimum value of the light transmittance of the optical intensity modulator is 0.

Namely, in order to make the duty ratio of the CS optical pulse train to be generated even smaller, it suffices to set the value of δ to 0, and to set the bias value and the value of the intensity amplitude of the second electric modulation signal such that the minimum value of the light transmittance of the optical intensity modulator becomes 0.

On the other hand, as shown in FIG. 7B, when the value of δ is π radians, the duty ratio increases monotonically in accordance with the increase in the extinction ratio of the optical intensity modulator. In this case, the greater the extinction ratio of the optical intensity modulator is set, the greater the duty ratio can be made to be. However, in this case, there is an upper limit on the magnitude of the duty ratio that can be set.

Namely, when the extinction ratio of the optical intensity modulator is increased, a splitting phenomenon arises in which the peak of a single optical pulse structuring the generated CS optical pulse train is divided into plural peaks. The single optical pulse structuring the CS optical pulse train whose peak is divided into plural peaks cannot be used as a CS optical pulse train for generating an optical pulse signal of the usual CS-RZ format.

In a case in which the time change that provides changes in the light transmittance of the optical intensity modulator is a sine wave, the value of the maximum extinction ratio that is immediately before the occurrence of the splitting phenomenon of the single optical pulse structuring the CS optical pulse train that is generated and outputted at the optical intensity modulator is 3.5 dB. The duty ratio of the CS optical pulse train obtained by setting the value of the extinction ratio to 3.5 dB is 66%.

Namely, in order to make the duty ratio of the CS optical pulse train to be generated even larger, it suffices to set the value of δ to π, and to set the bias value and the value of the intensity amplitude of the second electric modulation signal such that the extinction ratio of the optical intensity modulator becomes the maximum value of immediately before the occurrence of the splitting phenomenon that divides the peak of a single optical pulse structuring the CS optical pulse train into plural peaks.

In accordance with the first CS optical pulse train generating device of the present exemplary embodiment, by adjusting the value of δ and adjusting the extinction ratio of the optical intensity modulator, it is possible to adjust/change, in the range of 36% to 66%, the duty ratio of the CS optical pulse train that is generated under the condition that the time change providing the change in the light transmittance of the optical intensity modulator is a sine wave.

The range in which the duty ratio can be adjusted/changed can be broadened more by providing, by a non-sinusoidal wave, the time change that provides the change in the light transmittance of the optical intensity modulator. This is realized by using an optical intensity modulator that is a voltage-control-type optical intensity modulator and that has the characteristic that the voltage dependence of the light transmittance is provided by a non-linear relationship. An example of an optical intensity modulator having such an optical intensity modulating characteristic is a semiconductor electroabsorption intensity modulator.

Figure 8B:
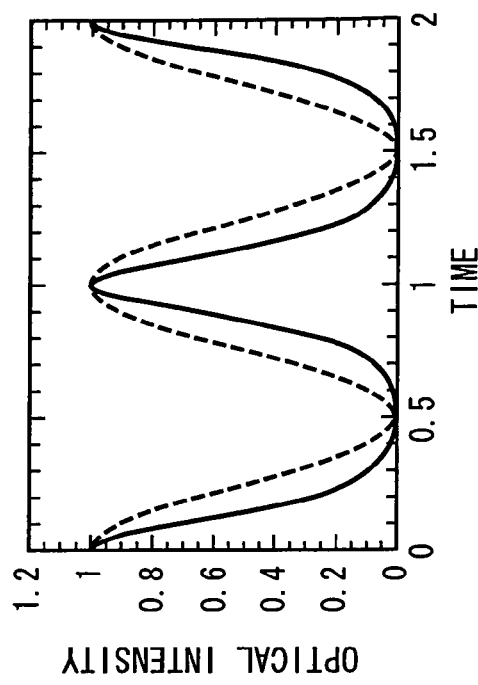
FIG. 8B and FIG. 8C are drawings showing optical intensity time waveforms of CS optical pulse trains that are generated and outputted when an semiconductor electroabsorption intensity modulator is driven by a sine-wave-shaped second electric modulation signal, that are provided for explanation of the adjustable/variable range of the duty ratio in a case in which the non-linear optical intensity modulator is used.
Figure 8C:
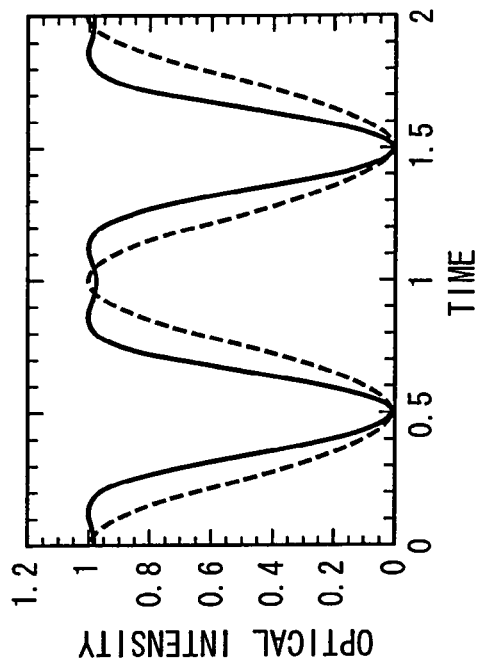
Figure 8A:
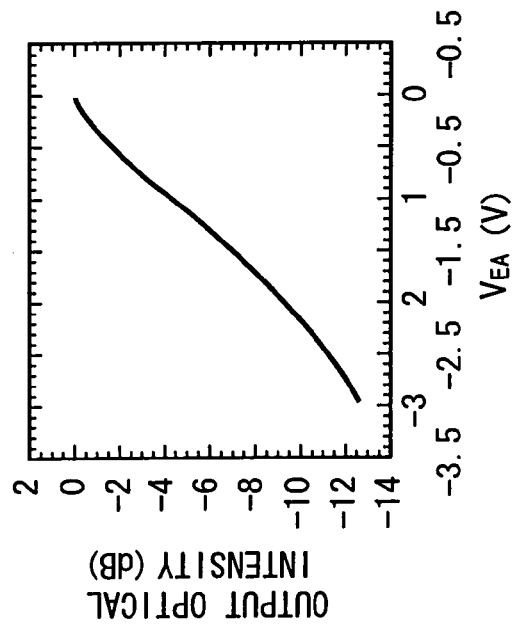
FIG. 8A is a drawing showing the relationship of light output intensity with respect to applied voltage VEA of an semiconductor electroabsorption intensity modulator, that is provided for explanation of an adjustable/variable range of the duty ratio in a case in which a non-linear optical intensity modulator is used.

The range over which the duty ratio can be adjusted/changed, that is obtained in a case using an optical intensity modulator having the characteristic that the voltage dependence of the light transmittance is provided by a non-linear relationship (hereinafter called a non-linear optical intensity modulator upon occasion), will be described with reference to FIG. 8A through FIG. 8C. FIG. 8A through FIG. 8C are drawings provided for explaining the duty ratio adjustable/changeable range in a case in which a non-linear optical intensity modulator is used.

FIG. 8A is a drawing showing the relationship of light output intensity with respect to applied voltage VEA of a semiconductor electroabsorption intensity modulator. The applied voltage VEA is marked on the horizontal axis in units of volts, and the output light intensity is marked in dB on the vertical axis. FIGS. 8B and 8C are drawings showing the optical intensity time waveform of the CS optical pulse train that is generated and outputted in a case in which the semiconductor electroabsorption intensity modulator is driven by the second electric modulation signal that is sine-wave-shaped.

In FIG. 8B, the bias voltage of the second electric modulation signal is −0.5 V, a value Vpp of the intensity amplitude is 1 V, and the value of the phase difference δ between the first electric modulation signal and the second electric modulation signal is set to π radians. Further, in FIG. 8C, the bias voltage of the second electric modulation signal is −3.0 V, the value Vpp of the intensity amplitude is 3 V, and the value of δ is set to 0 radians.

By setting the bias voltage and the value Vpp of the intensity amplitude of the second electric modulation signal to the aforementioned values respectively, the semiconductor electroabsorption intensity modulator is made to operate as a non-linear optical intensity modulator.

In FIG. 8B and FIG. 8C, the dashed line shows the optical intensity time waveform of the two-mode beat light, and the solid line shows the optical intensity time waveform of the generated CS optical pulse train.

A case in which a CS optical pulse train, whose duty ratio is the maximum, is generated is shown in FIG. 8B, and the duty ratio is 69%. Further, a case in which a CS optical pulse train, whose duty ratio is the minimum, is generated is shown in FIG. 8C, and the duty ratio is 26%.

Namely, in accordance with the first CS optical pulse train generating device of the present exemplary embodiment, by adjusting the value of δ and by adjusting the extinction ratio of the optical intensity modulator, it is possible to adjust/change the duty ratio of the CS optical pulse train to be generated in the range of 26% to 69%, under the condition that the time change that provides the change in the light transmittance of the optical intensity modulator is a non-sinusoidal wave. Due thereto, the range of adjusting/changing the duty ratio can be broadened even more by changing the time change, that provides the change in the light transmittance of the optical intensity modulator, from a sine wave to a non-sinusoidal wave.

<Second CS Optical Pulse Train Generating Device>
(Structure)

Figure 9:
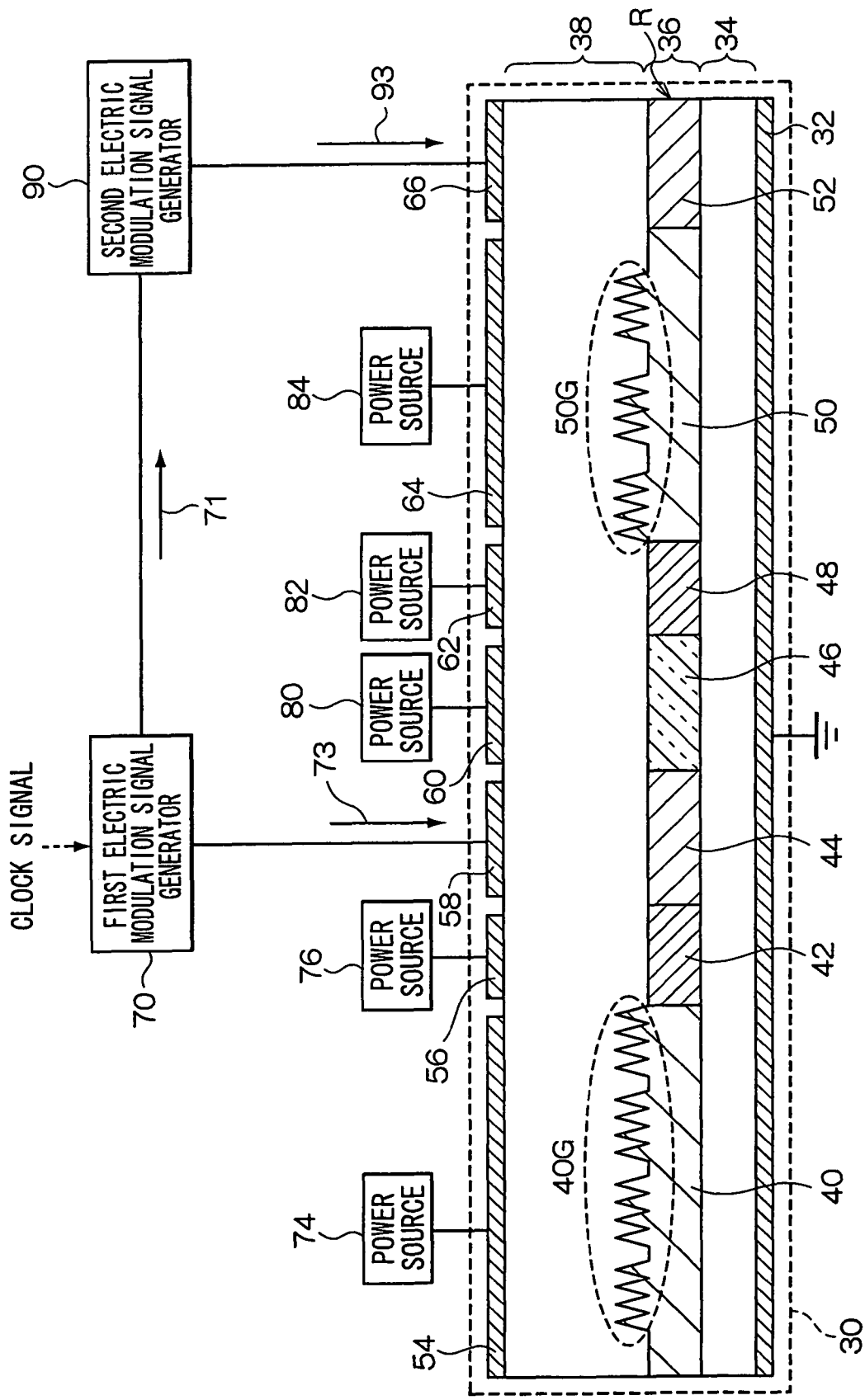
FIG. 9 is a schematic structural diagram of a second CS optical pulse train generating device of an exemplary embodiment of the present invention.

The structure of a second CS optical pulse train generating device of the present exemplary embodiment will be described with reference to FIG. 9. FIG. 9 is a schematic structural diagram of the second CS optical pulse train generating device of the exemplary embodiment of the invention.

The second CS optical pulse train generating device of the present exemplary embodiment is structured to include a first electric modulation signal generator 70, a second electric modulation signal generator 90, and a Bragg reflection semiconductor laser 30.

The first electric modulation signal generator 70 generates and outputs a first electric modulation signal 73 that is synchronous with a clock signal. The second electric modulation signal generator 90 generates and outputs a second electric modulation signal 93 that is the same frequency as the first electric modulation signal 73 and to which a phase difference of δ radians is provided.

The method of synchronizing the phases of the first electric modulation signal 73 and the second electric modulation signal 93 and making the phase difference between the both be δ radians is similar to the case in the first CS optical pulse train generating device, and therefore, repeat description will be omitted. In FIG. 9, it is assumed that the first electric modulation signal 73 and the second electric modulation signal 93 are generated by the above-described first method, and simplified illustration is given. Note that the device may be structured to generate the first electric modulation signal 73 and the second electric modulation signal 93 in accordance with the above-described second method.

The Bragg reflection semiconductor laser 30 has a first sampled grating region 40 and a second sampled grating region 50, a first optical intensity modulating region 44 and a second optical intensity modulating region 52, a gain region 46 at which an inverted distribution is formed, and a first phase adjusting region 42 and a second phase adjusting region 48 at which the equivalent refractive index can be varied. Hereinafter, when referring to both the first sampled grating region 40 and the second sampled grating region 50, they will be simply called the "sampled grating regions" upon occasion, to the extent that no misunderstanding arises.

At the first optical intensity modulating region 44 and the second optical intensity modulating region 52, an electric field absorbing effect is manifested due to inverse bias voltage being applied, and optical intensity modulation is thereby realized.

The basic structure of the Bragg reflection semiconductor laser 30 is a structure in which an optical waveguide layer 36 is sandwiched between a p-side cladding layer 38 and an n-side cladding layer 34, and is a current-injection-type semiconductor laser in accordance with the p-n junction. The aforementioned sampled grating regions, first optical intensity modulating region 44 and second optical intensity modulating region 52, gain region 46 at which an inverted distribution is formed, and first phase adjusting region 42 and second phase adjusting region 48 at which the equivalent refractive index can be varied, are respectively structured by an optical waveguide and the double hetero structure of the p-side cladding layer 38 and the n-side cladding layer 34 that sandwich the optical waveguide.

The demarcating of the aforementioned respective regions is carried out by electrodes that are structured so as to contact the p-side cladding layer. Different power sources corresponding to the respective functions are connected to the above respective regions, and the respective functions are manifested by electric signals supplied from these power sources. Accordingly, the above respective regions are structured to include the p-side cladding layer 38 and the n-side cladding layer 34 that sandwich the optical waveguide layer 36, and respective p-side electrodes and an n-side common electrode 32. However, for convenience of explanation, the respective regions are designated by indicating the optical waveguide existing in the corresponding region.

Namely, at the first sampled grating region 40, the equivalent refractive index is adjusted by a control electric signal being supplied from a power source 74 via a p-side electrode 54 of the first sampled grating region. At the second sampled grating region 50, the equivalent refractive index is adjusted by a control electric signal being supplied from a power source 84 via a p-side electrode 64 of the second sampled grating region. The first optical intensity modulating region 44 is driven by the first electric modulation signal 73 being supplied from the first electric modulation signal generator 70 via a p-side electrode 58 of the first optical intensity modulating region. The second optical intensity modulating region 52 is driven by the second electric modulation signal 93 being supplied from the second electric modulation signal generator 90 via a p-side electrode 66 of the second optical intensity modulating region. At the gain region 46, a population inversion is formed due to injection current being supplied from a power source 80 via a p-side electrode 60 of the gain region. A modulation electric signal that modulates the equivalent refractive index is supplied to the first phase adjusting region 42 from a power source 76 via a p-side electrode 56 of the first phase adjusting region, and the phase of an optical pulse passing through this region is modulated. A modulation electric signal that modulates the equivalent refractive index is supplied to the second phase adjusting region 48 from a power source 82 via a p-side electrode 62 of the second phase adjusting region, and the phase of an optical pulse passing through this region is modulated.

Sampled gratings 40G and 50G, that are formed at the first sampled grating region 40 and the second sampled grating region 50 respectively, are structured such that a short-period grating is incorporated into one period of a long-period grating, and are gratings having a double period structure of a long period and a short period. The first optical intensity modulating region 44 and the second optical intensity modulating region 52 have the function of modulating the optical intensity. Further, the first optical intensity modulating region 44, the gain region 46, the first phase adjusting region 42 and the second phase adjusting region 48 are disposed in series between the first sampled grating region 40 and the second sampled grating region 50. The second optical intensity modulating region 52 is outside of the region that is sandwiched between the first sampled grating region 40 and the second sampled grating region 50, and is disposed in series adjacent to either one of the first sampled grating region 40 and the second sampled grating region 50.

The Bragg reflection semiconductor laser 30 is mode-lock-operated by the light transmittance of the first optical intensity modulating region 44 being modulated by the first electric modulation signal 73, and can be made to output a CS optical pulse train.

Further, the Bragg reflection semiconductor laser 30 can vary the wavelength of the oscillation light by changing the equivalent refractive indices of the sampled grating regions, the first phase adjusting region 42 and the second phase adjusting region 48. Moreover, the Bragg reflection semiconductor laser 30 can control the duty ratio of the optical pulses structuring the CS optical pulse train by modulating the light transmittance of the second optical intensity modulating region 52 by the second electric modulation signal 93.

The relationships of correspondence between the structural elements of the first CS optical pulse train generating device and the second CS optical pulse train generating device are as follows. The two-mode beat light source 18 of the first CS optical pulse train generating device shown in FIG. 1 corresponds to the portions other than the second optical intensity modulating region 52 of the Bragg reflection semiconductor laser 30 of the second CS optical pulse train generating device. Further, the optical intensity modulator 20 of the first CS optical pulse train generating device corresponds to the second optical intensity modulating region 52 of the second CS optical pulse train generating device.

The structures and the functions of the first electric modulation signal generator 70 and the second electric modulation signal generator 90, that generate and output the first electric modulation signal 73 and the second electric modulation signal 93, are similar to the first CS optical pulse train generating device. Therefore, repeat description will be omitted.

The Bragg reflection semiconductor laser 30 may be structured so as to have only one of the first phase adjusting region 42 and the second phase adjusting region 48. Further, the order of arrangement of the first phase adjusting region 42, the first optical intensity modulating region 44, the gain region 46, and the second phase adjusting region 48 is not limited to the order shown in FIG. 9. For example, they may be arranged in the order of the first optical intensity modulating region 44, the first phase adjusting region 42, the gain region 46, and the second phase adjusting region 48.

It is suitable that the band gap wavelength of the semiconductor material structuring the optical waveguides existing at the respective regions of the Bragg reflection semiconductor laser 30 be set as follows. Namely, it is suitable that the band gap wavelengths of the sampled grating regions, the first phase adjusting region 42 and the second phase adjusting region 48 be set to the short wavelength side with respect to the laser oscillation wavelength that is determined by the optical gain characteristic of the gain region 46 and the Bragg reflecting characteristic at the sampled grating regions, and be transparent regions with respect to the laser oscillation light.

For example, in a case in which the Bragg reflection semiconductor laser 30 is structured by an InP type semiconductor, the wavelength of the laser oscillation light is in a vicinity of 1.55 μm. In this case, it is suitable that the optical waveguides existing at the sampled grating regions, the first phase adjusting region 42 and the second phase adjusting region 48 be structured by InGaAsP bulk crystal structures or quantum well structures of band gap wavelengths in the range of 1.1 μm to 1.3 μm.

On the other hand, it is suitable that the first optical intensity modulating region 44 and the second optical intensity modulating region 52 be set at a band gap composition which is a short wavelength with respect to the laser oscillation wavelength, to the extent that, at the time when the band gap wavelength shifts toward the long wavelength side due to inverse bias voltage that is applied to the region, the band end partially overlaps the laser oscillation wavelength. In a case in which the wavelength of the laser oscillation light is in the vicinity of 1.55 μm, it is suitable that the first optical intensity modulating region 44 and the second optical intensity modulating region 52 be InGaAsP bulk crystal structures or quantum well structures of band gap wavelengths of 1.45 μm to 1.5 μm.

The structures and functions of the sampled gratings 40G and 50G, that structure the first sampled grating region 40 and the second sampled grating region 50 respectively, will be described with reference to FIG. 10A and FIG. 10B.

Figure 10A:
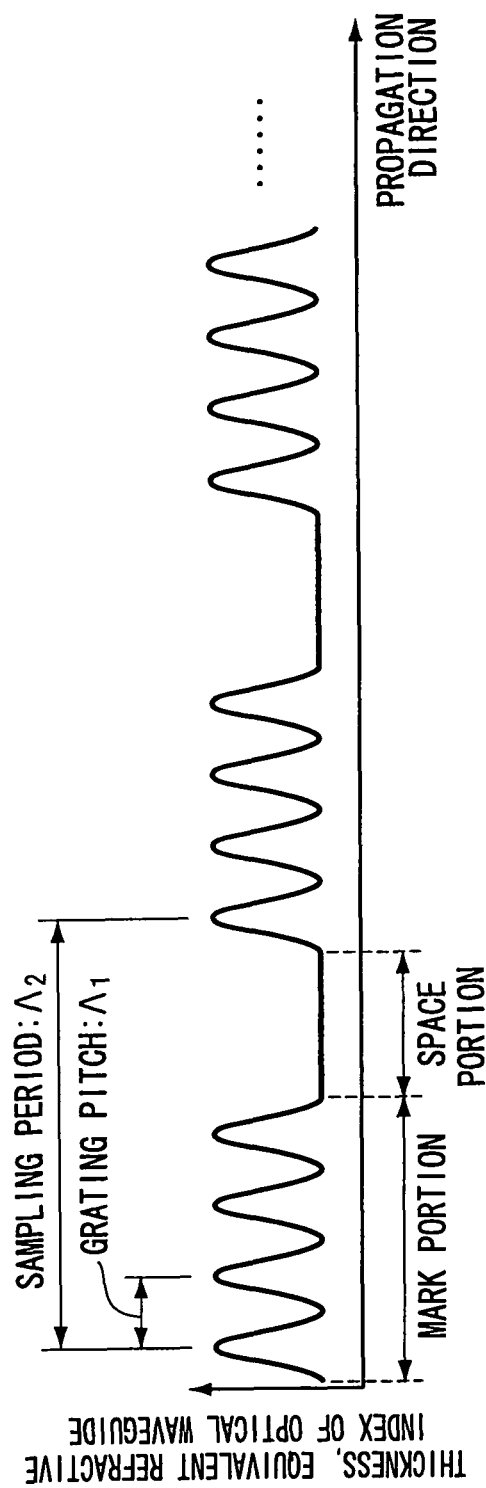
FIG. 10A is a drawing showing a sampled grating equivalent refractive index distribution along the lengthwise direction of an optical waveguide that is the propagating direction of laser light, that is provided for explanation of the structure and function of sampled gratings that structure a first sampled grating region and a second sampled grating region, respectively.

FIG. 10A is a drawing showing the equivalent refractive index distribution of the sampled gratings 40G and 50G along the lengthwise direction of the optical waveguide that is the direction of propagation of the laser light. The equivalent refractive index can be varied by varying the geometric thickness of the optical waveguide. The changed amount of the change in the geometric thickness of the optical waveguide, i.e., the state of change of the equivalent refractive index, is shown schematically so as to be marked on an arbitrary scale in the vertical axis direction of FIG. 10A.

Figure 10B:
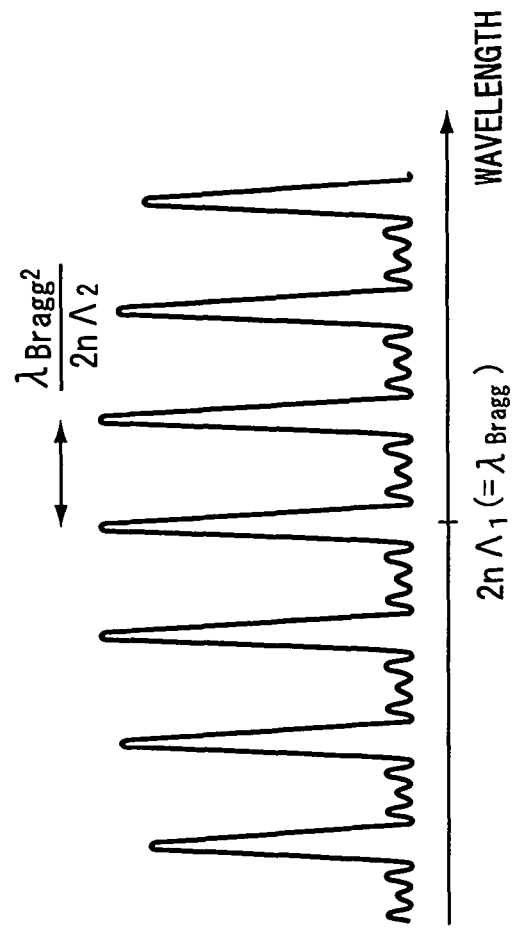
FIG. 10B is a drawing showing the reflecting characteristic in accordance with a Bragg reflecting structure in a case in which the period structure of the refractive index is Λ, that is provided for explanation of the structure and function of the sampled gratings that structure the first sampled grating region and the second sampled grating region, respectively.

FIG. 10B is a drawing showing the Bragg reflectance spectrum that is the reflection characteristic in accordance with the Bragg reflecting structure, in a case in which the period structure of the equivalent refractive index is Λ. The wavelength and the intensity of the reflected light are marked on arbitrary scales on the horizontal axis and the vertical axis of FIG. 10B, respectively.

The sampled gratings 40G and 50G, that structure the first sampled grating region 40 and the second sampled grating region 50 respectively, are formed in accordance with the equivalent refractive index distribution shown in FIG. 10A (the distribution of the changes in the geometric thickness of the optical waveguide). Namely, the sampled gratings 40G and 50G have a structure in which the portions where diffraction grating of a uniform period Λ1 is formed and portions where it is not formed are arranged periodically with respect to the direction of propagation of the laser light.

Hereinafter, the portions where the diffraction grating of the uniform period Λ1 is formed are called "mark portions", and the portions where the diffraction grating is not formed are called "space portions". Further, a sum Λ2 of the length of the mark portion and the length of the space portion is called a "sampling period". Further, the period Λ1 is called the "grating pitch Λ1". The same holds for the second sampled grating region 50 as well. Namely, the grating pitch of the second sampled grating region 50 is Λ3, and the sampling period is Λ4.

Regularity is not particularly required between the grating pitch Λ1 and the sampling period Λ2 of the first sampled grating region 40, and the grating pitch Λ3 and the sampling period Λ4 of the second sampled grating region 50. However, when considering the structure of the Bragg reflection semiconductor laser 30, the structure that is easiest to manufacture is as follows.

The optical waveguide layer 36, the n-side cladding layer 34, and the p-side cladding layer 38 of the first sampled grating region 40 and the second sampled grating region 50 are structured so as to have the same composition and the same optical waveguide widths. Then, by using a laser interference exposure method, the grating pitches Λ1 and Λ3 of the sampled gratings 40G and 50G respectively are structured to be equal. However, the sampling periods Λ2 and Λ4 of the sampled gratings 40G and 50G respectively must be set to separate values for the following reason.

The Bragg reflection semiconductor laser 30 generates two-mode beat light due to laser light circling through the first phase adjusting region 42, the first optical intensity modulating region 44, the gain region 46 and the second phase adjusting region 48 that are disposed at a region between optical resonators. The region between the optical resonators is formed by reflecting mirrors that are realized by the first sampled grating region 40 and the second sampled grating region 50. In order to make the Bragg reflection semiconductor laser 30 manifest mode-locking operation of the repetition frequency Δf, the optical lengths of the respective regions of the first phase adjusting region 42, the first optical intensity modulating region 44, the gain region 46 and the second phase adjusting region 48 are adjusted such that the aforementioned optical resonator circling frequency of the Bragg reflection semiconductor laser 30 becomes a frequency approximating Δf.

The optical resonator circling frequency being a frequency that "approximates" Δf means that the difference between an integer multiple of the optical resonator circling frequency of the Bragg reflection semiconductor laser 30, and the repetition frequency of the two-mode beat light that is the laser oscillation light generated at the region between the optical resonators, is small to the extent that the frequency pulling-in that is needed for causing mode-locking operation arises. Further, the "optical resonator circling frequency" is the reciprocal of the time required for the optical pulse to circle through one time the optical resonator structured by the first sampled grating region 40 and the second sampled grating region 50.

A boundary face R between the second optical intensity modulating region 52 and the exterior is subjected to a non-reflective coating processing. This is in order to prevent instability of the mode-locking operation due to the threshold gain of the gain region 46 giving rise to fluctuations due to the light, that is reflected at the boundary face R between the second optical intensity modulating region 52 and the exterior, becoming mixed-in within the optical resonator.

(Operation)

When current that is greater than or equal to the laser oscillation threshold value is injected into the gain region 46 and the first electric modulation signal 73 is supplied from the first electric modulation signal generator 70 to the first optical intensity modulating region 44, the mode-locking operation is manifested. Then, an optical pulse train, that is synchronous with the first electric modulation signal 73 and whose repetition frequency is Δf, is generated within the optical resonator of the Bragg reflection semiconductor laser 30. As will be described later, the generated optical pulse train is two-mode beat light. The generated optical pulse train is inputted to the second optical intensity modulating region 52. From the second optical intensity modulating region 52, the CS optical pulse train passes-through the boundary face R between the second optical intensity modulating region 52 and the exterior, and is outputted to the exterior.

In the Bragg reflection semiconductor laser 30 shown in FIG. 9, instead of providing the second optical intensity modulating region 52 adjacent to the second sampled grating region 50, the second optical intensity modulating region 52 may be provided adjacent to the first sampled grating region 40. At the optical resonator of the Bragg reflection semiconductor laser 30, two-mode beat light is generated and is outputted to the exterior of the optical resonator. Namely, the place where the second optical intensity modulating region 52, that carries out optical intensity modulation of the two-mode beat light, is provided may be at either the left or the right of the optical resonator, provided that it is at the exterior of the optical resonator of the Bragg reflection semiconductor laser 30.

The optical spectrum structure of the CS optical pulse train, that passes through the boundary face R between the exterior and the second optical intensity modulating region 52 of the Bragg reflection semiconductor laser 30 and is outputted to the exterior, will be described. To this end, first, Bragg reflectance in a sampled grating region will be considered.

The reflection characteristic of a sampled grating having the equivalent refractive index distribution structure shown in FIG. 10A is discussed in a thesis (V. Jayaraman, Z-M. Chuang, and L. A. Coldren, "Theory, Design, and Performance of Extended Tuning Range Semiconductor Lasers with Sampled Gratings", IEEE Journal of Quantum Electronics, vol. 29, No. 6, pp. 1824-1834, 1993).

According to the above thesis by V. Jayaraman et al., the Bragg reflection characteristic of a sampled grating having the equivalent refractive index distribution structure shown in FIG. 10A is generally a Bragg reflectance spectrum structure having multi-peaked reflectance peaks as shown in FIG. 10B. This Bragg reflectance spectrum is structured by a tan h-type (hyperbolic tangent type) reflection spectrum component having the peak of reflectance at the wavelength provided by $\lambda Bragg=2n\Lambda 1$, and plural tan h-type reflection spectrum components having auxiliary peaks (maxima) at wavelengths that are separated from the peak reflection wavelength by integer multiples of $\lambda Bragg^2/(2n\Lambda 2)$. Here, n is the average value of the equivalent refractive index of the sampled grating region.

The oscillation wavelength of a sampled grating type DBR laser is structured to have, at both ends of the optical resonator, sampled gratings having the equivalent refractive index distribution structure shown in FIG. 10B. The oscillation wavelength of a sampled grating type DBR laser is determined by the wavelength at which the value of the product of the Bragg reflectances of the sampled gratings at the both ends structuring the optical resonator becomes a maximum. If the maximum interval $\lambda Bragg^2/(2n\Lambda 2)$ of the Bragg reflectances of the sampled gratings at the both ends of the optical resonator differs and a mechanism that can vary the equivalent refractive index n is formed, the laser oscillation wavelength can be controlled by adjusting the equivalent refractive index n of the sampled gratings at both ends or at one end.

The phenomenon of the laser oscillation wavelength changing by adjusting the equivalent refractive index n of the sampled gratings in this way is called the Vernier effect. The above thesis of V. Jayaraman et al. states that, by appropriately selecting the grating pitch, the sampling period, the ratio of the length of the space portion to the mark portion, and the like of the sampled gratings structuring the optical resonator, a wavelength variable characteristic of a wide range over a width of 100 nm is obtained.

As described above, by structuring the optical resonator of the Bragg reflection semiconductor laser 30 by sampled grating regions, the oscillation wavelength in the mode-locking operation can be varied over a wide range. Due thereto, the wavelength of the oscillation light that is generated within the optical resonator can be varied within this range. Namely, the wavelength of the CS optical pulse train, that is outputted from the boundary face R between the exterior and the second optical intensity modulating region 52 of the Bragg reflection semiconductor laser 30, can be varied over a wide range.

The principles of operation that make it possible to vary, over a wide range, the wavelength of the two-mode beat light that is generated within the optical resonator of the Bragg reflection semiconductor laser 30, will be described in detail with reference to FIG. 11A through FIG. 11D and FIG. 12A through FIG. 12D.

FIG. 11A through FIG. 11D are drawings provided for explaining the mechanism by which the wavelength of the two-mode beat light that is generated within the optical resonator of the Bragg reflection semiconductor laser 30, is determined. Further, FIG. 11A through FIG. 11D are drawings showing a case in which the wavelengths of the main peaks of the Bragg reflectance spectra of the first sampled grating region 40 and the second sampled grating region 50 are the same. FIG. 11A is a drawing showing the Bragg reflectance spectrum of the first sampled grating region 40. FIG. 11B is a drawing showing the Bragg reflectance spectrum of the second sampled grating region 50. FIG. 11C is a drawing showing the product of both spectra of the Bragg reflectances of the first and second sampled grating regions. FIG. 11D is a drawing showing the longitudinal mode spectrum of the optical resonator of the Bragg reflection semiconductor laser 30. In FIG. 11A through FIG. 11D, wavelength and optical intensity are marked on the horizontal axis and on the vertical axis, respectively, on arbitrary scales.

First, as initial conditions, as shown in FIG. 11A through FIG. 11D, the Bragg reflectance spectra of the first sampled grating region 40 and the second sampled grating region 50 have the same Bragg reflection wavelengths, and the intervals between the maximum positions (peak wavelengths) of the Bragg reflectances are values that differ from one another.

A sampled grating region that satisfies such conditions can be fabricated by a usual DBR laser manufacturing process. Namely, the mark portions of the sampled grating regions are masked on the top surfaces of the optical waveguides 36 that have the same compositions and the same widths and thicknesses, and grating structures are formed at the unmasked space portions by a usual laser interference exposure method so as to be the same grating pitch, i.e., such that $\Lambda 1=\Lambda 3$. Next, the aforementioned mask is removed, and the p-side cladding layer 38 of the same composition is formed on the first sampled grating region 40 and the second sampled grating region 50.

In order to change the interval $\lambda Bragg^2/(2n\Lambda 2)$ between the maximum positions (peak wavelengths) of the Bragg reflectance spectra of the first sampled grating region 40 and the second sampled grating region 50, it suffices to change the interval of one or both of the mark portions or space portions. The periodic equivalent refractive index structures of the sampled grating regions can be fabricated by the aforementioned laser interference exposure method, or by an electron beam exposure method as well.

The maximum position (peak wavelength) intervals of the Bragg reflectance spectra of the first sampled grating region 40 and the second sampled grating region 50 are values that are different from one another. Therefore, as shown in FIG. 11C, the main peak of the wavelength spectrum provided by the product of the both appears at a position that is equal to the Bragg reflection wavelength. Namely, this is a substantially single-peaked spectrum structure. The laser oscillation of the Bragg reflection semiconductor laser 30 arises in the resonator mode that approximates the main peak of this single-peaked spectrum.

Here, the following are set in order for the frequency spectrum band, that is obtained by converting the above-described wavelength spectrum of the sampled grating into frequency, to be the same extent as the repetition frequency $\Delta f$ of the oscillation light generated within the optical resonator of the Bragg reflection semiconductor laser 30: the coupling coefficient of the first sampled grating region 40 and the second sampled grating region 50; the sampling period; the ratio of the lengths of the mark portion and the space portion of the sampling; and the sampling number that is defined as the number of repetitions of the mark portion and the space portion. In this case, as shown in FIG. 11D, there are at the most about two modulation sidebands of the frequency interval Δf of the laser oscillation light generated within the optical resonator of the Bragg reflection semiconductor laser 30, which modulation sidebands arise within the frequency band. These two sidebands (longitudinal mode spectrum components) exist at symmetrical positions with respect to the main peak position shown in FIG. 11D.

Namely, the number of longitudinal modes of the oscillation of the Bragg reflection semiconductor laser 30 is limited to about 2 at the most. Further, if the longitudinal mode positions of the longitudinal mode spectrum of the Bragg reflection semiconductor laser 30 are adjusted so as to become symmetrical with respect to the peak wavelength position of the wavelength spectrum of the sampled grating, the two sidebands that are adjacent to the peak wavelength of the wavelength spectrum of the sampled grating satisfy laser oscillation conditions that are equivalent to one another.

The wavelength spectrum of the oscillation light, that is generated within the optical resonator of the Bragg reflection semiconductor laser 30 in this state, is structured from two modulation sidebands having equal peak intensities. At this time, the optical intensity time waveform of the generated oscillation light is a sine wave, and as a result, this oscillation light is two-mode beat light. Accordingly, in accordance with the second CS optical pulse train generating device, the two-mode beat light generated within the optical resonator of the Bragg reflection semiconductor laser 30 is, in the same way as the optical intensity modulator 20 of the first CS optical pulse train generating device, optical-intensity-modulated by the second optical intensity modulating region 52, and is generated and outputted as a CS optical pulse train. In this way, in accordance with the second CS optical pulse train generating device, the duty ratio of the CS optical pulse train that is generated and outputted can be varied over a wide range.

A plasma effect is manifested by carrying out current injection at the first phase adjusting region 42 and the second phase adjusting region 48, and the equivalent refractive index of the first phase adjusting region 42 and the second phase adjusting region 48 can thereby be adjusted. Accordingly, the adjusting of the longitudinal mode position of the longitudinal mode spectrum of the optical resonator of the Bragg reflection semiconductor laser 30 is realized by adjusting the current value injected to at least one of the first phase adjusting region 42 and the second phase adjusting region 48.

Further, the Pockels effect is manifested by applying inverse bias voltage to the first phase adjusting region 42 and the second phase adjusting region 48, and the equivalent refractive index of the first phase adjusting region 42 and the second phase adjusting region 48 can thereby be adjusted. Accordingly, in this case, the adjusting of the longitudinal mode position of the longitudinal mode spectrum of the optical resonator of the Bragg reflection semiconductor laser 30 is realized by adjusting the inverse bias voltage that is applied to at least one of the first phase adjusting region 42 and the second phase adjusting region 48.

Next, a case in which the Bragg reflection wavelengths of either one or both regions of the Bragg reflectance spectra of the first sampled grating region 40 and the second sampled grating region 50 do not coincide, will be studied. Such a state is realized by carrying out current injection or applying voltage by the power source 74 and the power source 84 respectively to either one or both regions of the Bragg reflectance spectra of the first sampled grating region 40 and the second sampled grating region 50.

The plasma effect can be manifested by carrying out current injection into the first sampled grating region 40 and the second sampled grating region 50. Due to the plasma effect, the equivalent refractive indices of both of the sampled grating regions are changed, and the Bragg reflection wavelength can be changed. Further, the Pockels effect can be manifested by applying voltage to the first sampled grating region 40 and the second sampled grating region 50. Also due thereto, the equivalent refractive indices of both of the sampled grating regions are changed, and the Bragg reflection wavelength can be changed. In either case, the Bragg reflection wavelength can be changed, and therefore, a state in which the Bragg reflection wavelengths of either one or both regions of the Bragg reflectance spectra of the first sampled grating region 40 and the second sampled grating region 50 do not coincide can be realized.

FIG. 12A through FIG. 12D are drawings that are provided for explaining the mechanism by which the wavelength of the two-mode beat light, that is generated within the optical resonator of the Bragg reflection semiconductor laser 30, is determined. Further, FIG. 12A through FIG. 12D are drawings showing a case in which the auxiliary peak of the Bragg reflectance spectrum of the first sampled grating region 40 and the auxiliary peak of the Bragg reflectance spectrum of the second sampled grating region 50 are different. Namely, FIG. 12A through FIG. 12D are drawings showing a case in which the Bragg reflection wavelengths are different. FIG. 12A is a drawing showing the Bragg reflectance spectrum of the first sampled grating region 40. FIG. 12B is a drawing showing the Bragg reflectance spectrum of the second sampled grating region 50. FIG. 12C is a drawing showing the product of the both spectra of the Bragg reflectances of the first and second sampled grating regions. FIG. 12D is a drawing showing the longitudinal mode spectrum of the optical resonator of the Bragg reflection semiconductor laser 30. In FIG. 12A through FIG. 12D, wavelength and optical intensity are marked on arbitrary scales on the horizontal axis and the vertical axis, respectively.

The main peak of the Bragg reflectance spectrum shown in FIG. 12B is shifted, with respect to the Bragg reflectance spectrum shown in FIG. 12A, by carrying out current injection or by applying voltage by the power source 74 and the power source 84 respectively to either one or both of the first sampled grating region 40 and the second sampled grating region 50.

When adjustment is carried out such that the auxiliary peak of the Bragg reflectance spectrum of the first sampled grating region 40 and the auxiliary peak of the Bragg reflectance spectrum of the second sampled grating region 50 coincide, the product of the Bragg reflectance spectra of the both is a substantially single-peaked spectrum structure as shown in FIG. 12C. At the optical resonator of the Bragg reflection semiconductor laser 30, laser oscillation arises in a resonator mode that approximates the main peak of this single-peaked spectrum.

Here, in the same way as the case explained with reference to the above-described FIG. 11A through FIG. 11D, the following are set in order for the frequency spectrum band, that is obtained by converting the wavelength spectrum of the sampled grating into frequency, to be the same extent as the repetition frequency Δf of the oscillation light generated within the optical resonator of the Bragg reflection semiconductor laser 30: the coupling coefficient of the first sampled grating region 40 and the second sampled grating region 50; the sampling period; the ratio of the lengths of the mark portion and the space portion of the sampling; and the sampling number that is defined as the number of repetitions of the mark portion and the space portion.

In this case, in the same way as the case explained with reference to above-described FIG. 11A through FIG. 11D, within the optical resonator of the Bragg reflection semiconductor laser 30, two-mode beat light whose optical intensity time waveform is a sine wave is generated. In this case, as shown in FIG. 12D, within the frequency band, there are at the most about two modulation sidebands (longitudinal mode spectrum components) of the frequency interval $\Delta f$ of the oscillation light generated within the optical resonator of the Bragg reflection semiconductor laser 30. These two sidebands exist at symmetrical positions with respect to the main peak position shown in FIG. 12D.

As a result, in accordance with the second CS optical pulse train generating device, the two-mode beat light, that is generated within the optical resonator formed by the first sampled grating region 40 and the second sampled grating region 50 of the Bragg reflection semiconductor laser 30, is optical-intensity-modulated by the second optical intensity modulating region 52, and is generated and outputted as a CS optical pulse train. The optical intensity modulation and the generating of the CS optical pulse train by the second optical intensity modulating region 52 are similar to the optical intensity modulator 20 of the first CS optical pulse train generating device. In this way, in accordance with the second CS optical pulse train generating device, the duty ratio of the CS optical pulse train that is generated and outputted can be varied within a wide range.

In the following description, what should be called the "optical resonator that is formed by the first sampled grating region 40 and the second sampled grating region 50" will, upon occasion, simply be called the "optical resonator".

Next, at the second CS optical pulse train generating device, the structure of the Bragg reflection semiconductor laser 30 is set such that the first optical intensity modulating region 44 is disposed at a position that is the center of the optical resonator, and the 2Nth order higher harmonic mode-locking operation is manifested at the time when the first electric modulation signal 73 whose frequency is $\Delta f$ is inputted to the first optical intensity modulating region 44. The effects obtained due thereto will be described hereinafter. Here, N is an integer of greater than or equal to 1.

The position of the center of the optical resonator is within the optical resonator, and indicates a position at which the time, until the optical pulse that has passed through the first optical intensity modulating region 44 is Bragg-reflected at the first sampled grating region 40 and returns to the first optical intensity modulating region 44, and the time, until the optical pulse that has passed through the first optical intensity modulating region 44 is Bragg-reflected at the second sampled grating region 50 and returns to the first optical intensity modulating region 50, become equal.

Namely, in a case in which the structure of the Bragg reflection semiconductor laser 30 is set such that the above-described first optical intensity modulating region 44 is disposed at the position of the center of the optical resonator and 2Nth order higher harmonic mode-locking operation is manifested, the reciprocal of the optical resonator circling frequency, that is the time required for an optical pulse to circle through the optical resonator one time, substantially coincides with $2N/\Delta f$. In other words, the optical resonator circling frequency approximates $1/(2N)$ of the repetition frequency $\Delta f$ of the first electric modulation signal 73.

This condition corresponds to both the above-described time, until the optical pulse that has passed through the first optical intensity modulating region 44 is Bragg-reflected at the first sampled grating region 40 and returns to the first optical intensity modulating region 44, and the above-described time, until the optical pulse that has passed through the first optical intensity modulating region 44 is Bragg-reflected at the second sampled grating region 50 and returns to the first optical intensity modulating region 44, coinciding with $N/\Delta f$.

Here, the optical resonator circling frequency "approximating" the repetition frequency of the first electric modulation signal 73 means that the difference between a positive integer multiple of the optical resonator circling frequency and the repetition frequency of the first electric modulation signal 73 is small to the extent that the frequency pulling-in needed for mode-locking operation arises.

The time required for an optical pulse to circle through the optical resonator once is equal to the value obtained by dividing a given value by light speed within a vacuum, where the given value is obtained by doubling the sum obtained by adding the penetration lengths of the first sampled grating region 40 and the second sampled grating region 50 to the optical lengths of the respective regions of the first phase adjusting region 42, the first optical intensity modulating region 44, the gain region 46 and the second phase adjusting region 48. Here, "optical length" is a value obtained by multiplying the geometric length (also called the physical length) by the equivalent refractive index. Further, "penetration length of the sampled grating region" means the equivalent optical length that is obtained by adding the reduction in the effective region length due to the Bragg reflection of the sampled grating. Namely, while the optical pulse inputted to the sampled grating region is Bragg-reflected, the optical intensity thereof is reduced and the optical pulse advances through the sampled grating region. The distance from the incident end of the sampled grating region to the position where the optical intensity of the optical pulse becomes an intensity of $1/e$ of the optical intensity at the incident end is called the "penetration length of the sampled grating region". Here, $e$ is the base of the natural logarithm.

Mode-locking operation of the fundamental order is realized at the optical resonator of the Bragg reflection semiconductor laser 30 of the second CS optical pulse train generating device. The "mode-locking operation of the fundamental order" means that the optical resonator circling frequency approximates the frequency $\Delta f$ of the first electric modulation signal 73.

In the second CS optical pulse train generating device, in order to increase the repetition frequency $\Delta f$ of the CS optical pulse train to be outputted, it is necessary to increase the optical resonator circling frequency. To this end, it suffices to shorten the physical lengths of the respective regions that are the first phase adjusting region 42, the first optical intensity modulating region 44, the gain region 46 and the second phase adjusting region 48 that structure the optical resonator, and the penetration lengths of the first sampled grating region 40 and the second sampled grating region 50.

However, there is a limit to making short the physical lengths of the respective regions structuring the optical resonator, and the penetration lengths of the sampled grating regions. For example, if the physical length of the gain region 46 is made to be too short, the gain needed for laser oscillation cannot be obtained. Further, if the physical length of the first optical intensity modulating region 44 is made to be too short, optical intensity modulation cannot be carried out to the depth of the extent needed for mode-locking operation.

Further, there are also limits to making the physical lengths of the sampled grating regions short. First, in order to obtain the effect of the sampled grating, quite a large number of pairs, which pair is the mark portion and the space portion of the grating, must be ensured. If a large number of pairs is ensured, the sampling period must be made to be short of necessity. If the sampling period is made to be too short, the peak interval ($\lambda$Bragg2/(2n$\Lambda$2)) of the Bragg reflectance spectrum of the sampled grating region becomes an extremely large value, and wavelength variable operation that is continuous cannot be realized.

Further, if the physical length of the sampled grating region is too short, it is difficult to make the Bragg reflectance large. As a result, the laser oscillation threshold value increases, and the Bragg reflectance spectrum band widens, and it is thereby difficult to obtain selective two-mode oscillation.

In contrast with this situation, the Bragg reflection semiconductor laser 30 of the second CS optical pulse train generating device is set such that the first optical intensity modulating region 44 is disposed at the position of the center of the optical resonator, and 2Nth order higher harmonic mode-locking operation is manifested at the time when the first electric modulation signal 73 whose frequency is $\Delta f$ is inputted to the first optical intensity modulating region 44. The following effects are thereby obtained.

Namely, by setting the device to such conditions, the reciprocal of the optical resonator circling frequency can be made to substantially coincide with 2N/$\Delta f$. This means that the optical length of the optical resonator becomes 2N times that of the case of causing basic mode-locking operation to be manifested. Accordingly, by setting the device to the conditions that the first optical intensity modulating region 44 is disposed at the position of the center of the optical resonator and 2Nth order higher harmonic mode-locking operation is manifested, there is no longer the need to make short the physical lengths of the respective regions structuring the optical resonator and the penetration lengths of the sampled grating regions when increasing the repetition frequency $\Delta f$ of the CS optical pulse train that is generated and outputted at the second CS optical pulse train generating device.

In the state in which the 2Nth order higher harmonic mode-locking operation is being manifested, during the time that an optical pulse circles through the optical resonator once, the optical pulse passes through the first optical intensity modulating region 44 twice and receives optical intensity modulation. In order to maintain the 2Nth order higher harmonic mode-locking operation temporally stable, the two optical intensity modulations that the optical pulse receives at the first optical intensity modulating region 44 must be realized to an equal extent.

For example, if the relative relationship between the time that the light transmittance of the first optical intensity modulating region 44 becomes the minimum and the time that the peak of the optical pulse passes through the first optical intensity modulating region 44 are different in each of the aforementioned two optical intensity modulations, an optical pulse having two separate characteristics is grown. In this case, at the first optical intensity modulating region 44, optical intensity modulation arises at the optical pulse that is generated within the optical resonator, and it is difficult to generate regular two-mode beat light whose peak intensities are uniform.

In order to avoid a situation in which it is difficult to generate regular two-mode beat light whose peak intensities are uniform within the optical resonator in this way, it suffices to dispose the first optical intensity modulating region 44 at the position of the center of the optical resonator. By doing so, the relative relationship between the time that the light transmittance of the first optical intensity modulating region 44 becomes the minimum and the time that the peak of the optical pulse passes through the first optical intensity modulating region 44, coincides in each of the aforementioned two optical intensity modulations. Therefore, an optical pulse having the same characteristic is grown within the optical resonator, and a regular CS optical pulse train whose peak intensities are uniform is generated.

It suffices to set the sampled grating regions as follows. Namely, it suffices to set the following so that the peak frequency of the single-peaked Bragg reflectance spectrum, that is provided by the product of the Bragg reflectance spectrum of the first sampled grating region 40 and the Bragg reflectance spectrum of the second sampled grating region 50, approximates the repetition frequency $\Delta f$ of the two-mode beat light generated within the optical resonator: the coupling coefficient of the sampled grating regions; the sampling period; the ratio of the lengths of the mark portion and the space portion of the sampling; and the sampling number that is defined as the number of repetitions of the mark portion and the space portion.

Here, the peak frequency of the single-peaked Bragg reflectance spectrum "approximating" the repetition frequency of the two-mode beat light generated within the optical resonator means that the difference between the peak frequency of the single-peaked Bragg reflectance spectrum and the repetition frequency of the two-mode beat light generated within the optical resonator, is small to the extent that the frequency pulling-in that is needed for causing mode-locking operation arises.

As described above, the device is set such that the first optical intensity modulating region 44 is disposed at a position that is the center of the optical resonator, and the 2Nth order higher harmonic mode-locking operation is manifested at the time when the first electric modulation signal 73 whose frequency is $\Delta f$ is inputted to the first optical intensity modulating region 44. Due thereto, the following effects are obtained. Namely, even in cases in which the repetition frequency $\Delta f$ is high, there is no need to make the optical resonator length extremely short. As a result, the laser oscillation threshold value is reduced, and a CS optical pulse train, that has sufficient intensity and a high repetition frequency, can be generated and outputted.

The above-described exemplary embodiment assumes a case in which the wavelength of the CS optical pulse train to be generated is the band of 1.5 µm. However, the second CS optical pulse train generating device of the invention can be designed as a device that generates a CS optical pulse train even at other than this frequency band. For example, structuring the second CS optical pulse train generating device of the invention as a device that generates a CS optical pulse train of a wavelength of the band of 0.8 µm is realized by making the semiconductor material that structures the Bragg reflection semiconductor laser 30 be a GaAs type semiconductor. Namely, the second CS optical pulse train generating device is a device that can be realized without being limited in theory by the wavelength of the CS optical pulse train to be generated.

Further, in the above-described exemplary embodiment, in the optical resonator of the Bragg reflection semiconductor laser 30, the mode-locking operation is manifested by supplying the first electric modulation signal 73 to the first optical intensity modulating region 44 from the exterior. Namely, active mode synchronization is manifested at the optical resonator. In contrast, the second CS optical pulse train generating device can similarly be realized by realizing passive mode-locking operation that causes mode-locking operation by controlling, from the exterior, the first optical intensity modulating region 44 to function as a saturable absorber.

However, if the second CS optical pulse train generating device is realized on the basis of passive mode-locking operation, in order to generate an optical pulse train (two-mode beat light) that is generated within the optical resonator synchronously with the first electric modulation signal 73, the first electric modulation signal 73 that includes, as a bias component, a DC component needed for causing the first optical intensity modulating region 44 to function as a saturable absorber, must be supplied from the exterior. Namely, in this case, two-mode beat light is generated within the optical resonator by causing the first optical intensity modulating region 44 to function as a saturable absorber and realizing hybrid mode-locking operation.

What is claimed is:

1. A carrier-suppressed optical pulse train generating device comprising:
    a first electric modulation signal generator generating and outputting a first electric modulation signal that is synchronous with a clock signal;
    a second electric modulation signal generator generating and outputting a second electric modulation signal of a same frequency as the first electric modulation signal and to which a phase difference of $\delta$ radians is provided, where $\delta$ is a real number satisfying $0 \leqq \delta \leqq \pi$;
    a two-mode beat light source driven by the first electric modulation signal, and generating and outputting two-mode beat light; and
    an optical intensity modulator to which the two-mode beat light is inputted, and that optical-intensity-modulates the two-mode beat light, and generates and outputs a carrier-suppressed optical pulse train having numerous longitudinal modes whose longitudinal mode spectra are greater than 2,
    wherein light transmittance of the optical intensity modulator is modulated by the second electric modulation signal.

2. The carrier-suppressed optical pulse train generating device of claim 1, wherein a value of $\delta$ is 0.

3. The carrier-suppressed optical pulse train generating device of claim 1, wherein a value of $\delta$ is $\pi$.

4. The carrier-suppressed optical pulse train generating device of claim 1, wherein a value of $\delta$ is 0, and a bias value and a value of an intensity amplitude of the second electric modulation signal are set such that a minimum value of the light transmittance of the optical intensity modulator is 0.

5. The carrier-suppressed optical pulse train generating device of claim 1, wherein a value of $\delta$ is $\pi$, and a bias value and a value of an intensity amplitude of the second electric modulation signal are set such that an extinction ratio, that is defined as a ratio of a maximum value and a minimum value of the light transmittance of the optical intensity modulator, is a maximum value of immediately before occurrence of a splitting phenomenon that divides a peak of a single optical pulse structuring the carrier-suppressed optical pulse train into a plurality of peaks.

6. A carrier-suppressed optical pulse train generating method comprising:
    a first electric modulation signal generating step generating and outputting, by a first electric modulation signal generator, a first electric modulation signal that is synchronous with a clock signal;
    a second electric modulation signal generating step generating and outputting, by a second electric modulation signal generator, a second electric modulation signal of a same frequency as the first electric modulation signal and having a phase difference of $\delta$ radians, where $\delta$ is a real number satisfying $0 \leqq \delta \leqq \pi$;
    a two-mode beat light generating step driving a two-mode beat light source by the first electric modulation signal, and generating and outputting two-mode beat light that is synchronous with the clock signal; and
    an optical intensity modulating step optical-intensity-modulating the two-mode beat light by an optical intensity modulator that is driven by the second electric modulation signal, and generating and outputting a carrier-suppressed optical pulse train having numerous longitudinal modes whose longitudinal mode spectra are greater than 2.

7. The carrier-suppressed optical pulse train generating method of claim 6, wherein a value of $\delta$ is 0.

8. The carrier-suppressed optical pulse train generating method of claim 6, wherein a value of $\delta$ is $\pi$.

9. The carrier-suppressed optical pulse train generating method of claim 6, wherein a value of $\delta$ is 0, and a bias value and a value of an intensity amplitude of the second electric modulation signal are set such that a minimum value of light transmittance of the optical intensity modulator is 0.

10. The carrier-suppressed optical pulse train generating method of claim 6, wherein a value of $\delta$ is $\pi$, and a bias value and a value of an intensity amplitude of the second electric modulation signal are set such that an extinction ratio, that is defined as a ratio of a maximum value and a minimum value of light transmittance of the optical intensity modulator, is a maximum value of immediately before occurrence of a splitting phenomenon that divides a peak of a single optical pulse structuring the carrier-suppressed optical pulse train into a plurality of peaks.

* * * * *